US011055568B2

(12) United States Patent
Vu et al.

(10) Patent No.: US 11,055,568 B2
(45) Date of Patent: Jul. 6, 2021

(54) METHOD AND SYSTEM THAT MEASURE APPLICATION RESPONSE TIME

(71) Applicant: VMWARE, INC., Palo Alto, CA (US)

(72) Inventors: Lan Vu, Palo Alto, CA (US); Uday Kurkure, Palo Alto, CA (US); Hari Sivaraman, Palo Alto, CA (US); Aravind Kumar Rao Bappanadu, Palo Alto, CA (US); Mohit Mangal, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 16/522,710

(22) Filed: Jul. 26, 2019

(65) Prior Publication Data
US 2021/0012155 A1    Jan. 14, 2021

(30) Foreign Application Priority Data
Jul. 10, 2019    (IN) .............................. 201944027597

(51) Int. Cl.
*G06K 9/62*    (2006.01)
*G06F 11/34*    (2006.01)
(Continued)

(52) U.S. Cl.
CPC ........ *G06K 9/6234* (2013.01); *G06F 11/3065* (2013.01); *G06F 11/3419* (2013.01);
(Continued)

(58) Field of Classification Search
CPC .......... G06N 3/049; G06N 3/02; G06N 3/088; G06T 2207/20081; G06T 2207/20084
See application file for complete search history.

(56) References Cited

U.S. PATENT DOCUMENTS

| | | | |
|---|---|---|---|
| 7,364,950 B2 * | 4/2008 | Funato .............. | H01L 23/49524 438/123 |
| 8,015,130 B2 * | 9/2011 | Matsugu .................. | G06N 3/08 706/16 |

(Continued)

*Primary Examiner* — Yosef Kassa

(57) ABSTRACT

The current document is directed to methods and systems that employ image-recognition and machine learning to directly measure application-program response time from changes in a user interface displayed by the application program in much the same way that application-program users perceive response times when manually issuing commands through the user interface. The currently disclosed methods and systems involve building recognition models, training the recognition models to recognize application-program states from changes in the user interface displayed by the application program, and using the recognition models to monitor the user interface displayed by an application program to detect and assign timestamps to application-program state changes, from which the elapsed time for various different operations is computed. This approach mirrors the methods by which users perceive application-program response time when users initiate operations through the application-program-provided user interface and visually monitor progress of the operations as reflected in changes to the displayed application-program user interface.

20 Claims, 41 Drawing Sheets

(51) Int. Cl.
*G06F 11/30* (2006.01)
*G06N 3/08* (2006.01)

(52) U.S. Cl.
CPC ......... *G06K 9/6256* (2013.01); *G06K 9/6269* (2013.01); *G06K 9/6276* (2013.01); *G06N 3/08* (2013.01)

(56) References Cited

U.S. PATENT DOCUMENTS

| | | | |
|---|---|---|---|
| 8,046,313 B2* | 10/2011 | Hoffberg | G06F 3/0482 706/14 |
| 8,793,205 B1* | 7/2014 | Fisher | G06N 3/008 706/25 |
| 9,070,039 B2* | 6/2015 | Richert | G06K 9/36 |
| 9,208,432 B2* | 12/2015 | Buibas | G06N 3/04 |

* cited by examiner

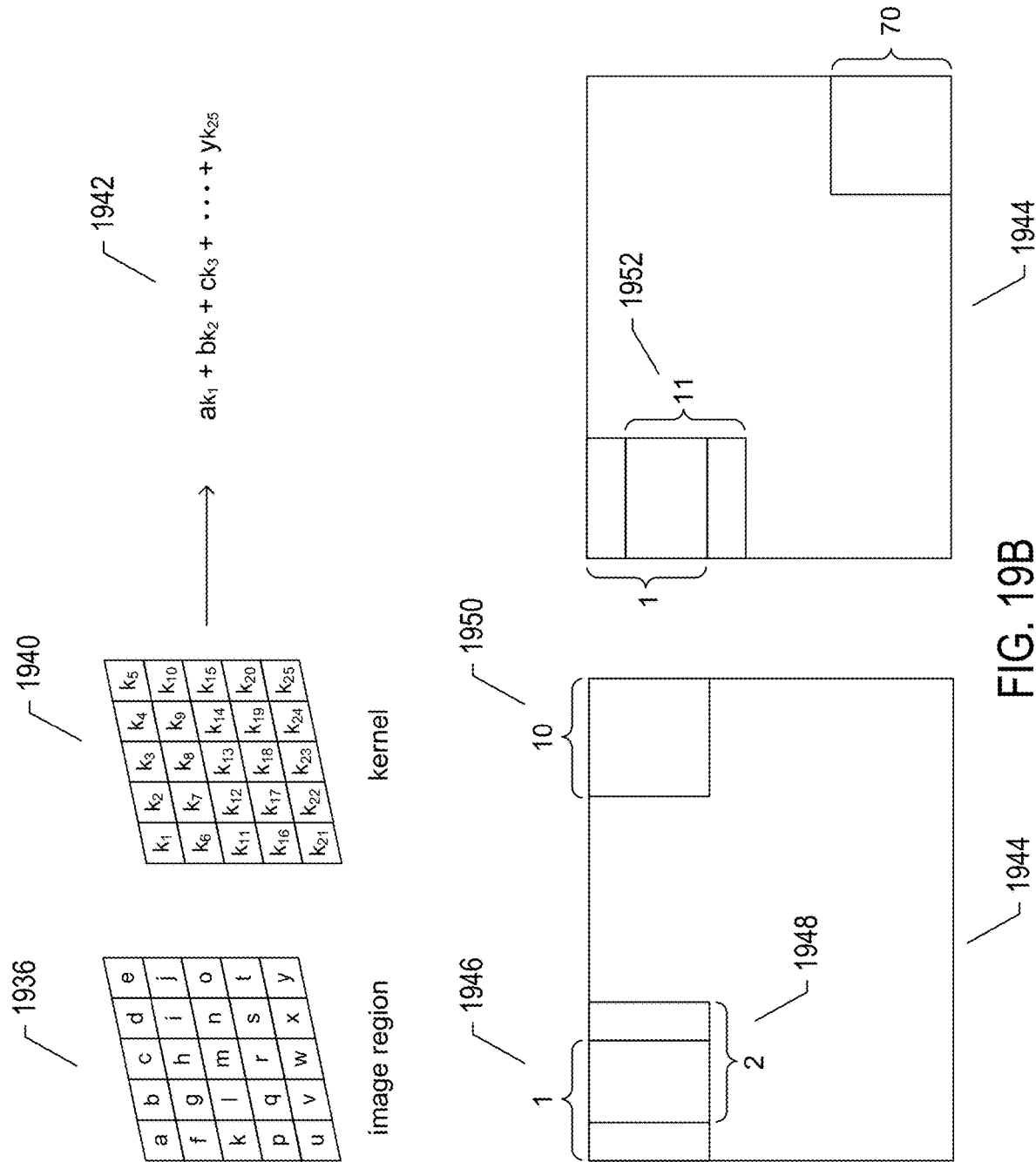

METHOD AND SYSTEM THAT MEASURE APPLICATION RESPONSE TIME

CROSS-REFERENCE TO RELATED APPLICATION

This application claims the benefit of Provisional Application No. 62/711,316, filed Jul. 27, 2018 and benefit is claimed under 35 U.S.C. 119(a)-(d) to Foreign Application Serial No. 201944027597 filed in India entitled "METHOD AND SYSTEM THAT MEASURE APPLICATION RESPONSE TIME", on Jul. 10, 2019, by VMWARE, Inc., which is herein incorporated in its entirety by reference for all purposes.

TECHNICAL FIELD

The current document is directed to computer-system performance monitoring and, in particular, to methods and systems that measure the performance of application programs using image-recognition techniques to identify operation-associated application-program state transitions in a displayed application-program user interface.

BACKGROUND

For a long period of time during the evolution of computer systems and application programs, application programs were designed to execute on standalone computers, such as personal computers ("PCs"), in which display of an application-program user interface is controlled by the same processor or processors, often in cooperation with a graphics processing unit, that execute the application program. In earlier computer systems, it was often possible to achieve relatively accurate performance monitoring using straightforward instrumentation added to the application-program code and/or by using operating-system-provided or specially developed performance-monitoring tools. However, during the past 20 years, the complexities and code sizes of application programs have greatly increased and new models for application-program execution and distribution have been developed, including software-as-a-service models in which application programs and even entire desktops run on cloud-computing facilities on behalf of remote users, as a result of which many additional dimensions and factors may contribute to perceived application performance by users, including network latencies and many additional layers of complexity within the various computer systems that cooperate to execute applications on behalf of users. In many cases, traditional approaches to monitoring application performance are no longer feasible. For example, instrumenting application programs may require detailed knowledge of the application-program code that performance-monitoring engineers lack. As another example, many of the operating-system-provided performance-monitoring tools that were available in earlier, less complex computer systems may no longer be available to performance-monitoring engineers and, even when still available, may no longer provide accurate response-times measurements due to many additional internal layers of complexity and additional variable latencies associated with these tools. When application programs or entire virtual desktops are provided as a service by cloud-computing facilities to remote client computers, far more complex distributed performance-monitoring tools and methods may need to be developed and, in many cases, such tools may still not accurately measure the types of application-response-time variabilities encountered in actual use cases and perceived by human users. As a result, performance-monitoring engineers, performance-tool developers, application developers, and users of application programs continue to seek more effective methods and systems for measuring application-program performance characteristics.

SUMMARY

The current document is directed to methods and systems that employ image-recognition and machine learning to directly measure application-program response time from changes in a user interface displayed by the application program in much the same way that application-program users perceive response times when manually issuing commands through the user interface. The currently disclosed methods and systems involve building recognition models, training the recognition models to recognize application-program states from changes in the user interface displayed by the application program, and using the recognition models to monitor the user interface displayed by an application program to detect and assign timestamps to application-program state changes, from which the elapsed time for various different operations is computed. This approach mirrors the methods by which users perceive application-program response time when users initiate operations through the application-program-provided user interface and visually monitor progress of the operations as reflected in changes to the displayed application-program user interface.

BRIEF DESCRIPTION OF THE DRAWINGS

FIGS. 19A-C FIGS. 19A-C illustrate a convolutional neural network.

DETAILED DESCRIPTION

Figure 1:
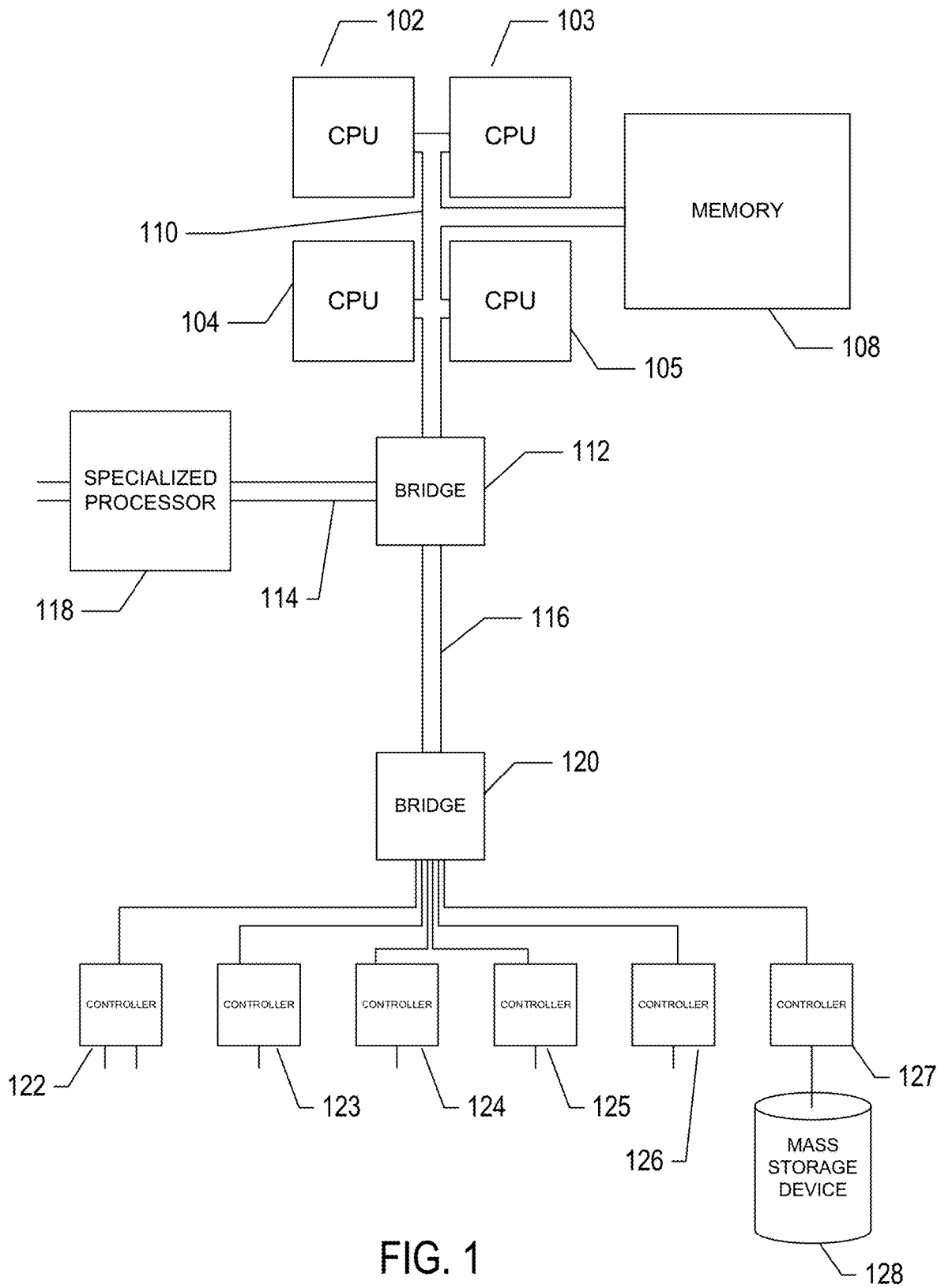
FIG. 1 provides a general architectural diagram for various types of computers.

The current document is directed to methods and systems that employ machine learning and image recognition to directly measure application-program performance from changes in the information displayed by the application program through an application-program user interface. In a first subsection, below, a detailed description of computer hardware, complex computational systems, and virtualization is provided with reference to FIGS. 1-10. In a second subsection, the methods and systems to which the current document is directed are discussed, with reference to FIGS. 11-23D.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
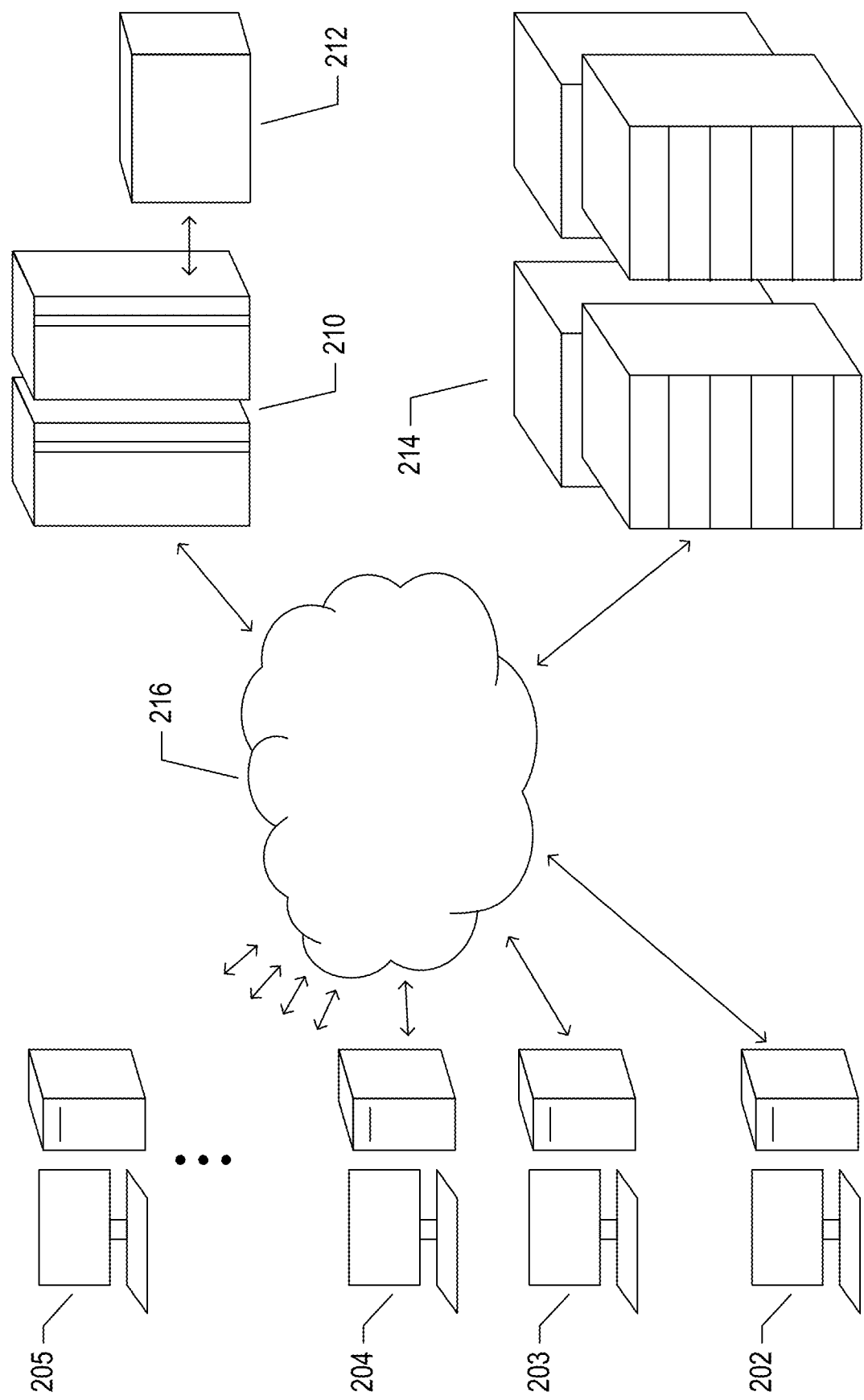
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
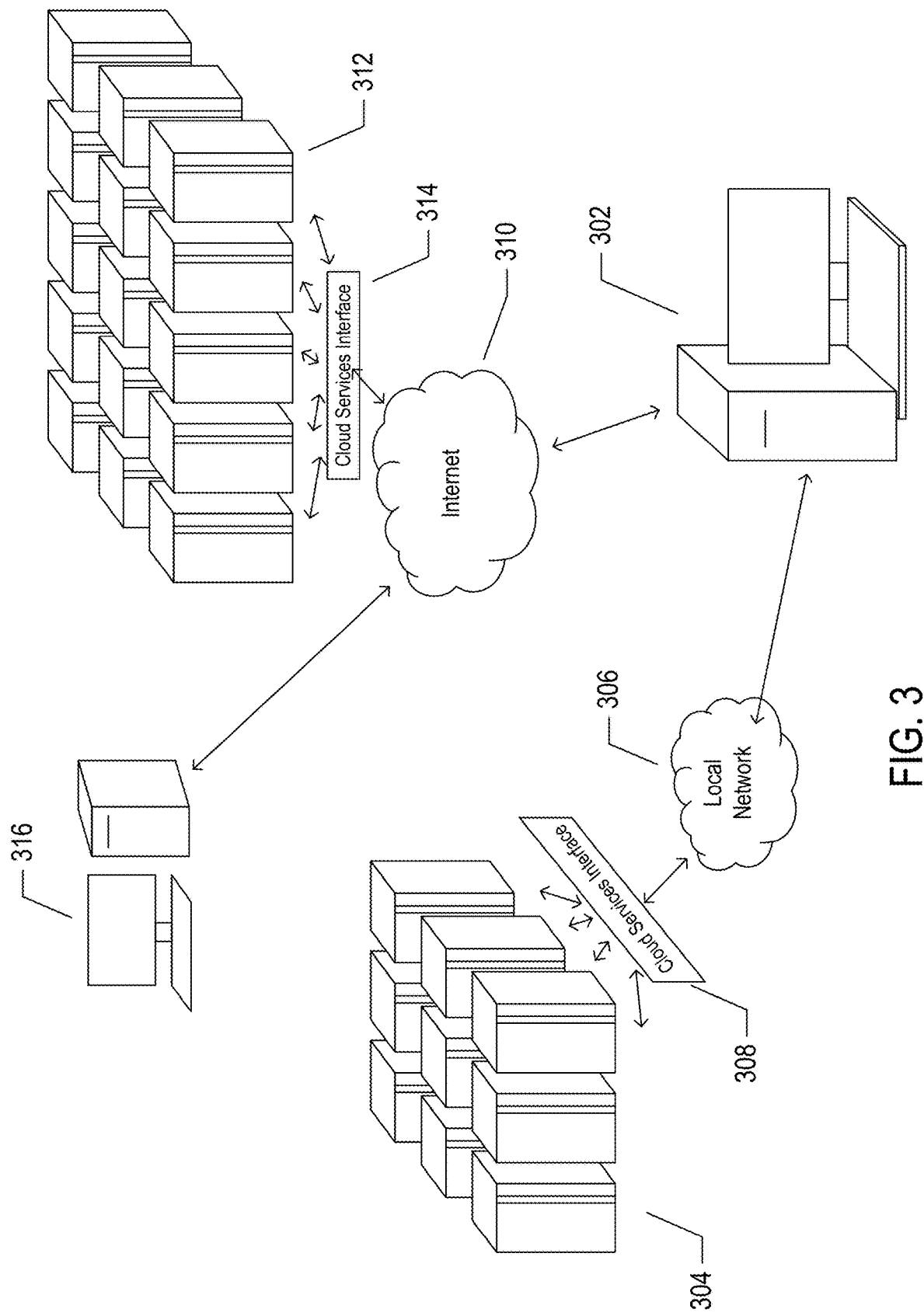
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
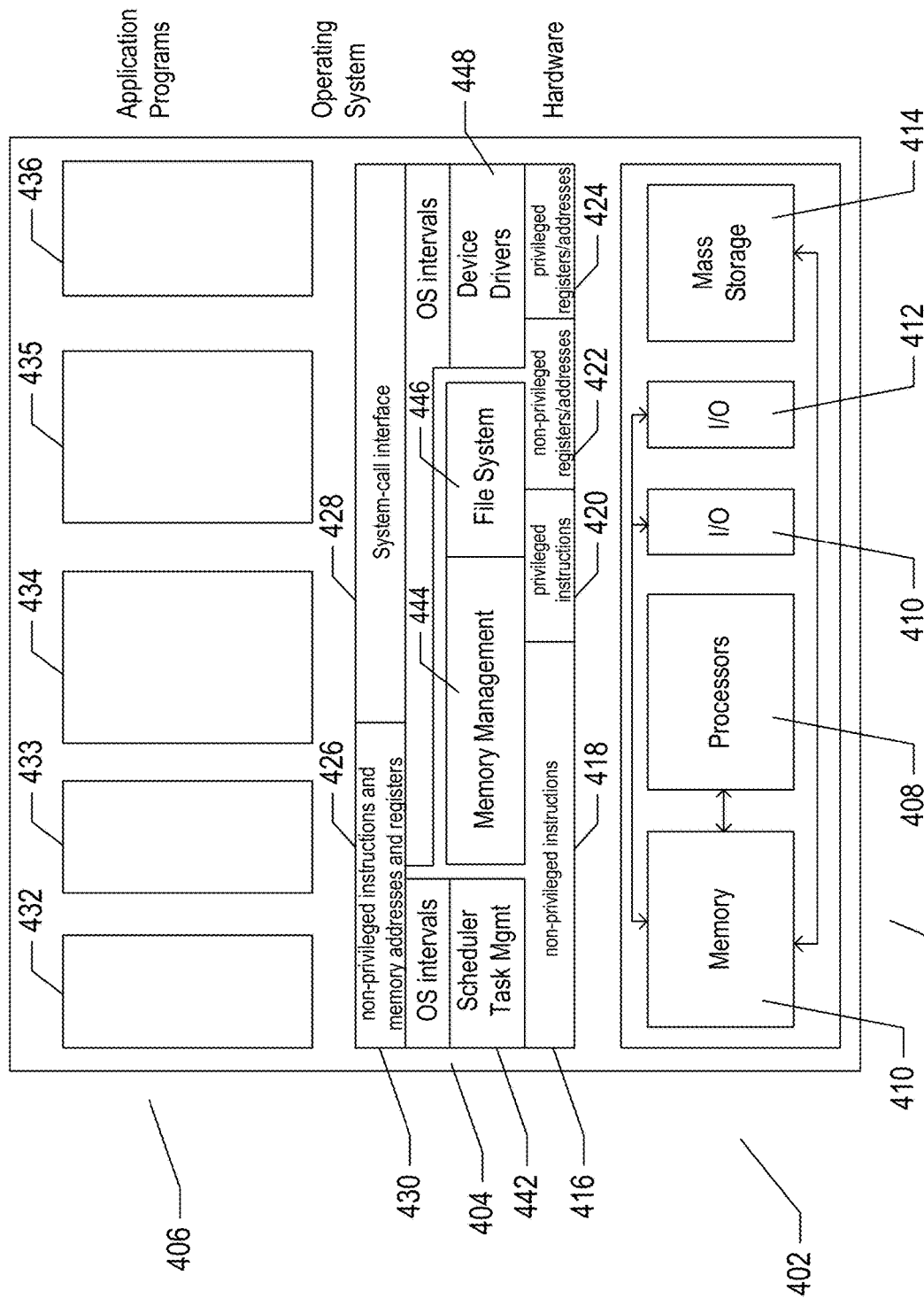
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
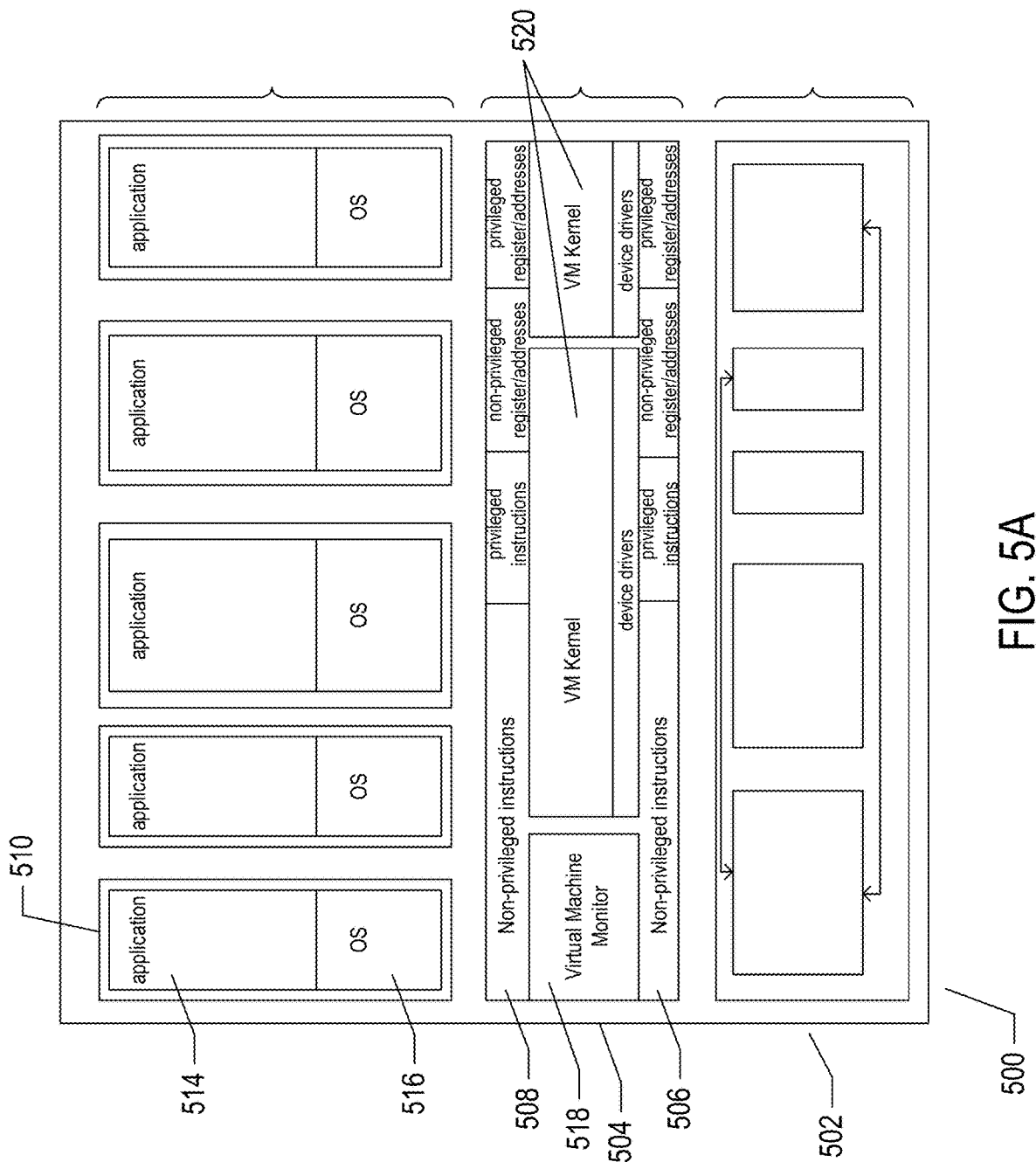
FIGS. 5A-D illustrate two types of virtual machine and virtual-machine execution environments.
Figure 5B:
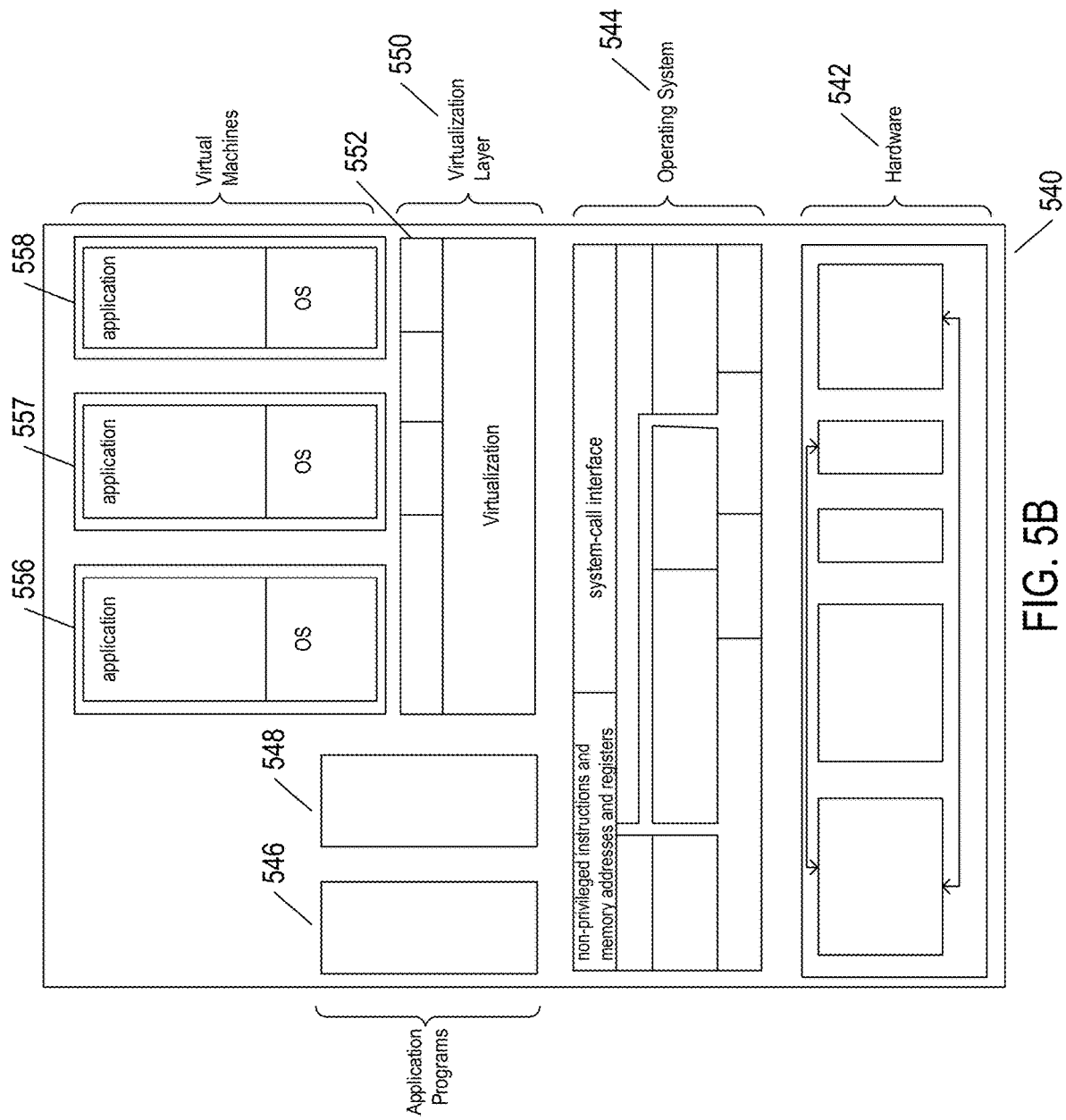

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
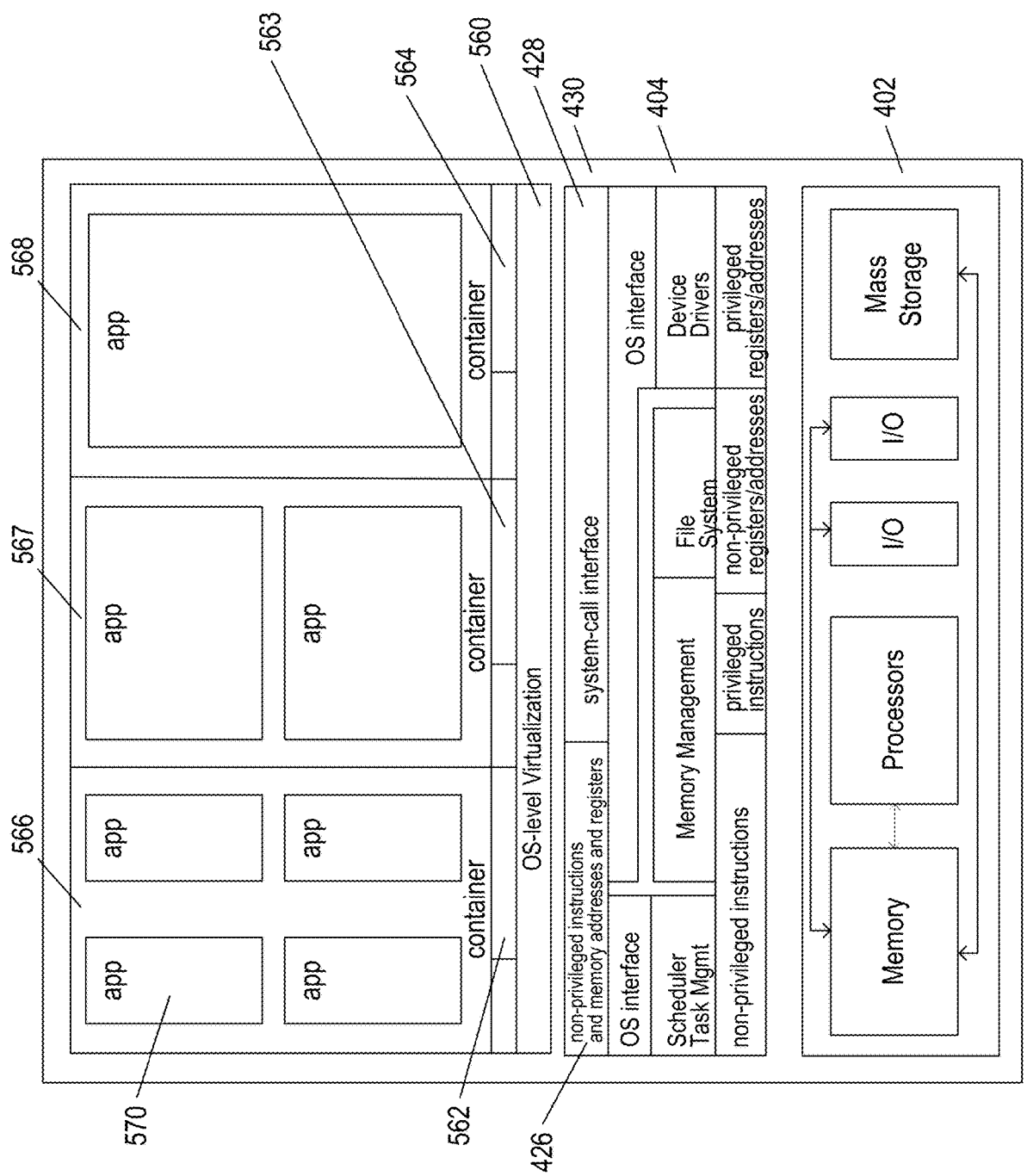

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
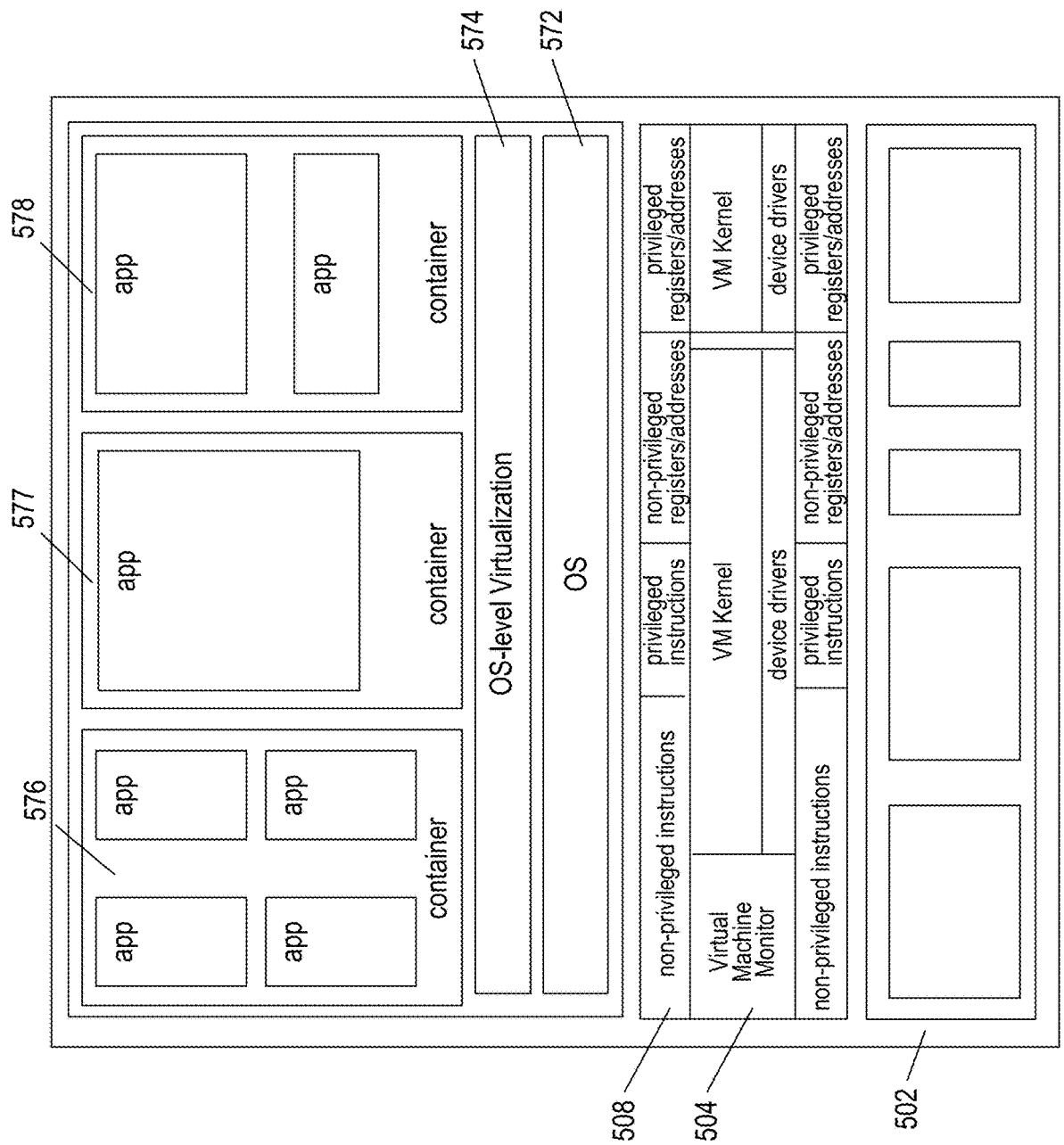

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
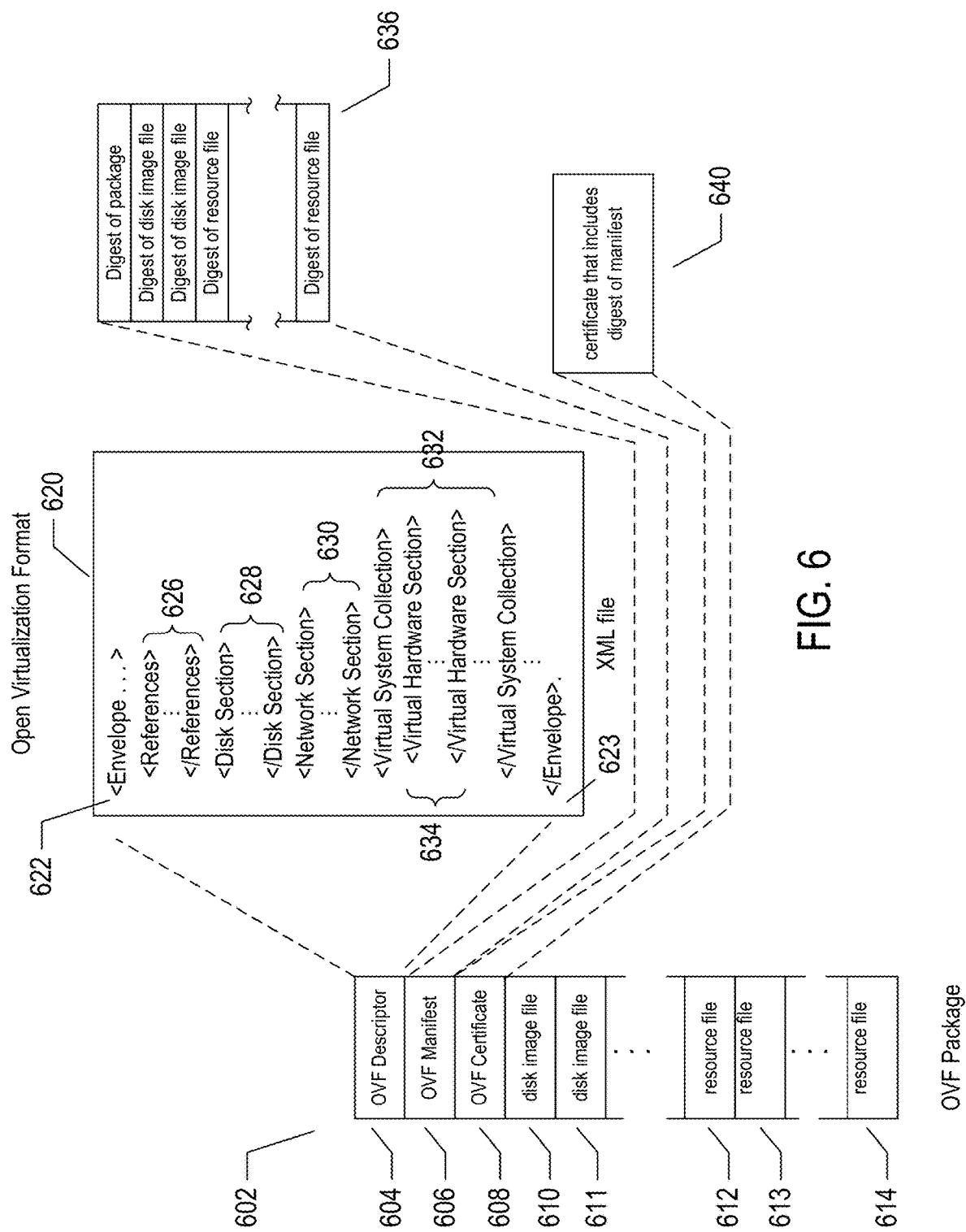
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
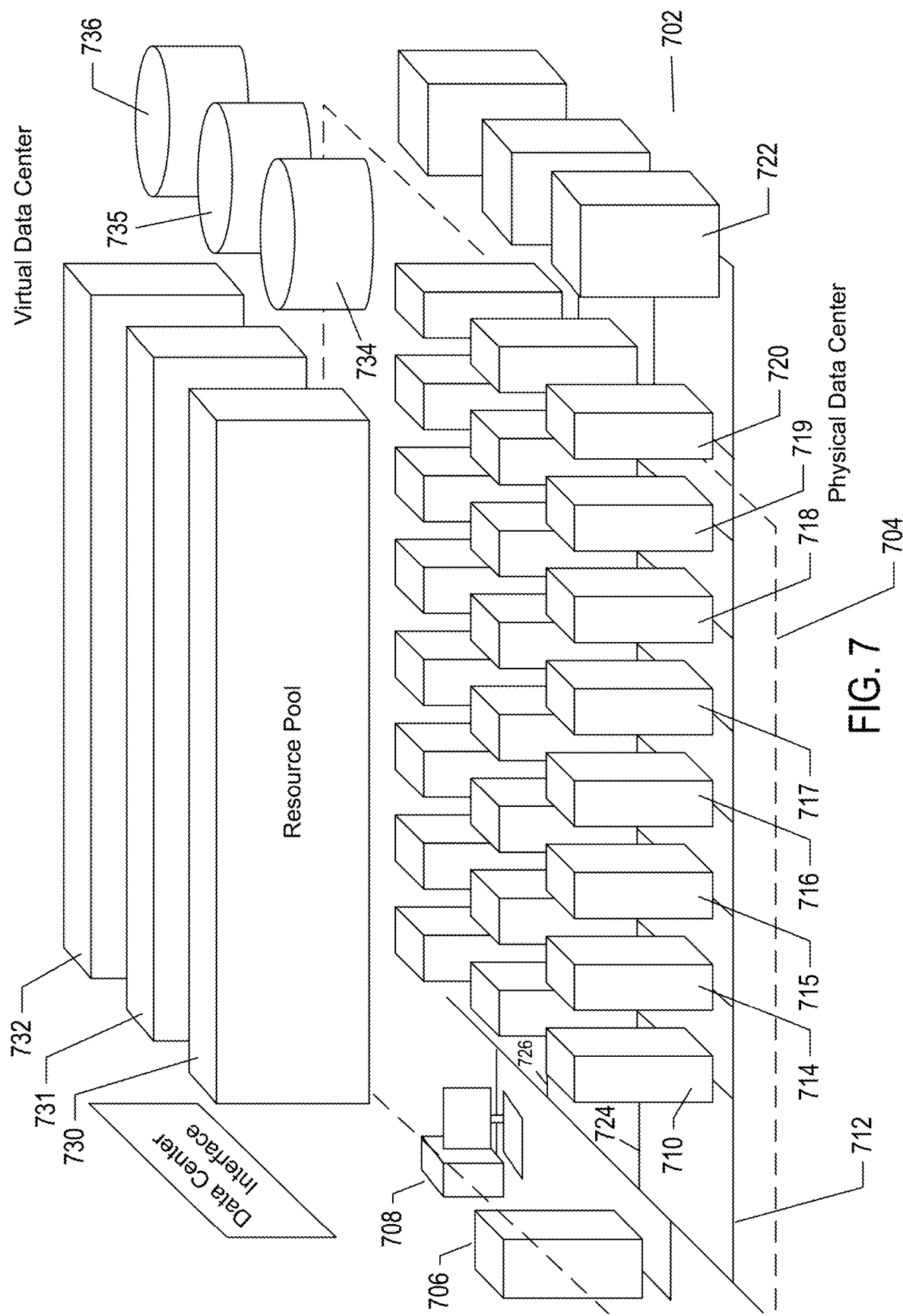
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
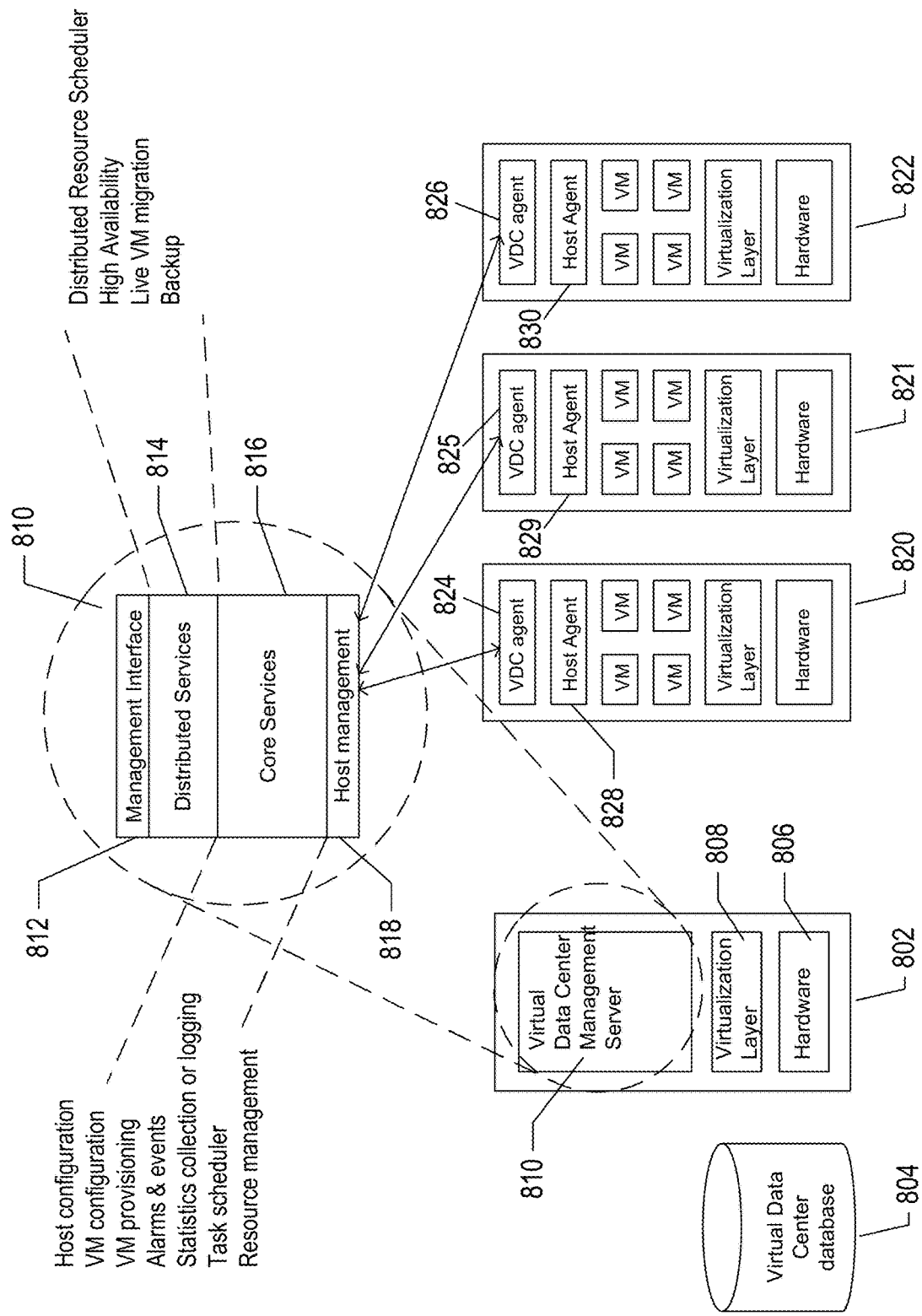
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
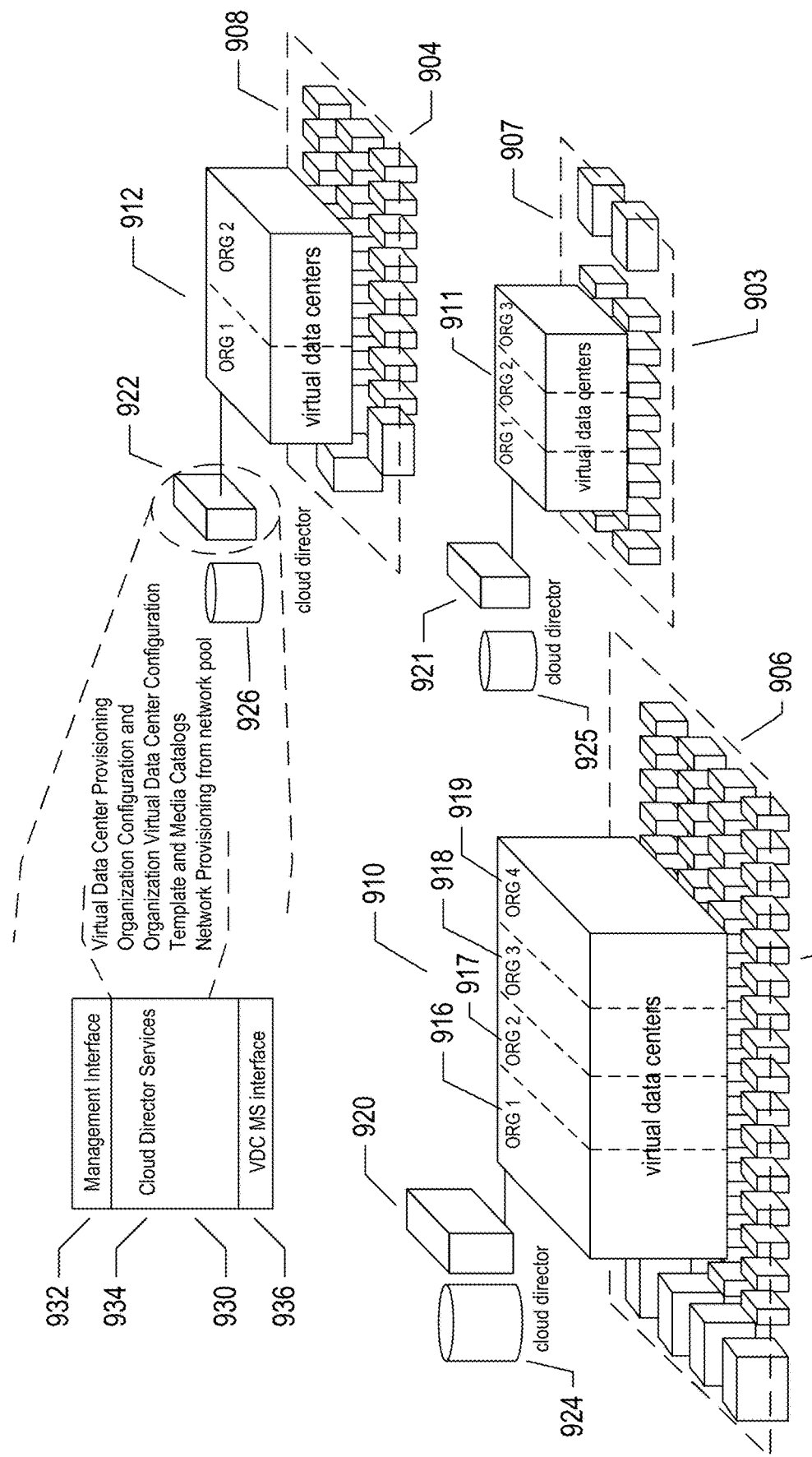
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
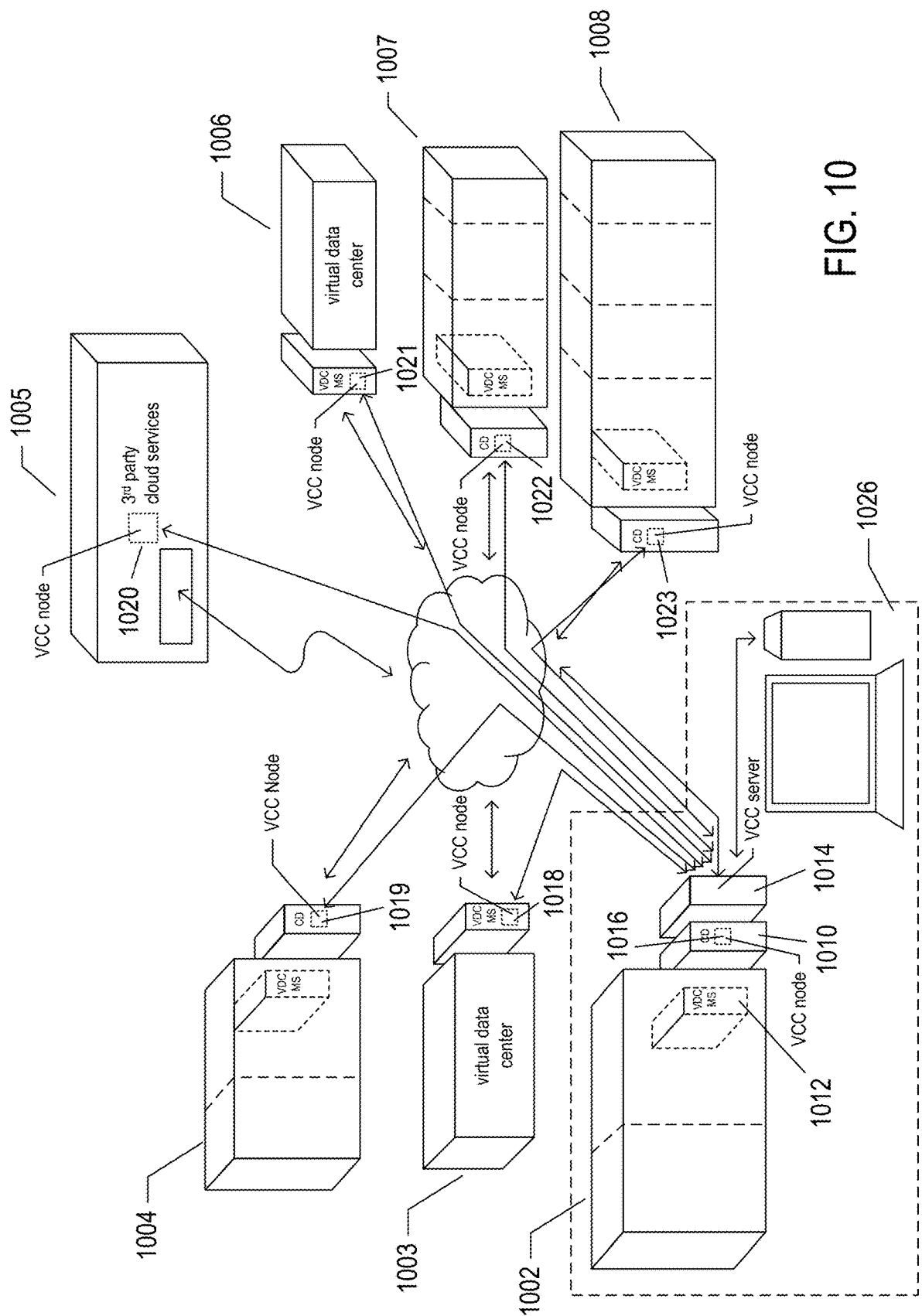
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Figure 11:
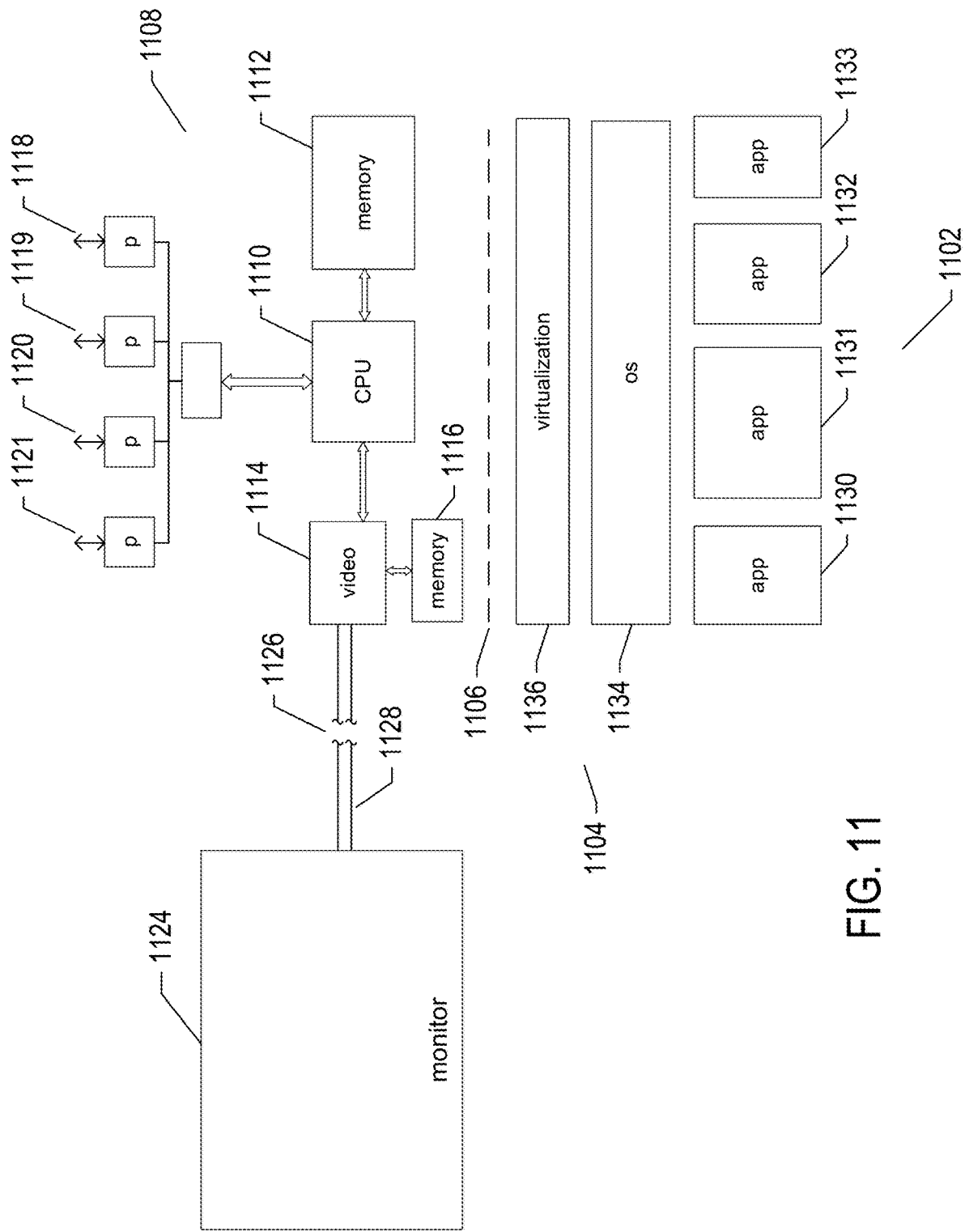
FIG. 11 illustrates an application-program execution environment that is used in subsequent discussion of the currently disclosed methods and systems.

FIG. 11 illustrates an application-program execution environment that is used in subsequent discussion of the currently disclosed methods and systems. For purposes of discussing the currently disclosed methods and systems, the term "application program" refers to programs and routines that execute above the virtualization-layer and operating-system level, and may include many different types of programs, from discrete application programs, such as word-processors and browsers, to virtual-desktop programs that simulate an entire personal computer on behalf of a remote user. On the right-hand side 1102 of FIG. 11, a computer-instruction-implemented portion 1104 of the application-program-execution environment is shown below a dashed line 1106. A hardware portion of the application-program-execution environment 1108 is shown above for the dashed line 1106. More detailed descriptions of the components of the application-program-execution environment are provided in the previous subsection.

The hardware portion of the application-program-execution environment 1108 includes one or more processors 1110, one or more memory components 1112, a video controller 1114 with video-controller memory 1116, and various peripheral-device controllers 1118-1121, such as network-interface cards, mass-storage-device controllers, keyboard and mouse controllers, and other such peripheral-device controllers. Of course, the hardware portion of an application-program-execution environment includes many other types of components, from power supplies and cooling fans to complex internal data-transmission components, including buses and high-speed serial interconnects. Output from the video controller 1114, itself controlled by computer instructions executing on the one or more processors 1110, is transmitted to a display monitor 1124 on which a user interface is displayed to a user. The interconnection from the hardware portion 1108 and the display monitor 1124 may be local and direct, as in a standalone PC, but may instead involve long-distance data transmission from a cloud-computing facility to a remote user device in the case that the application program is provided as a service by the cloud-computing facility. The break 1126 in the illustrated connection 1128 between the hardware portion 1108 and the display monitor 1124 is meant to indicate that an application-program-execution environment may be a standalone environment, a distributed environment involving multiple discrete computer systems and long-distance network connections, or other types of distributed environments that involve local area networks within more constrained, local regions.

The computer-instruction-implemented portion 1102 is logically organized in terms of execution environments, as discussed in the preceding subsection. A number of application programs 1130-1133 execute in execution environments provided by one or more operating systems 1134 which, in turn, execute within execution environments provided by a virtualization layer 1136. The computer-instruction-implemented portion 1102 is implemented by operation of the hardware portion 1108 under control of computer instructions corresponding to components and entities within the computer-instruction-implemented portion 1102. Of course, actual systems are far more complex than can be readily illustrated in figures such as FIG. 11. However, the high level of illustration used in FIG. 11 is suitable for discussing the currently disclosed methods and systems, below.

Figure 12A:
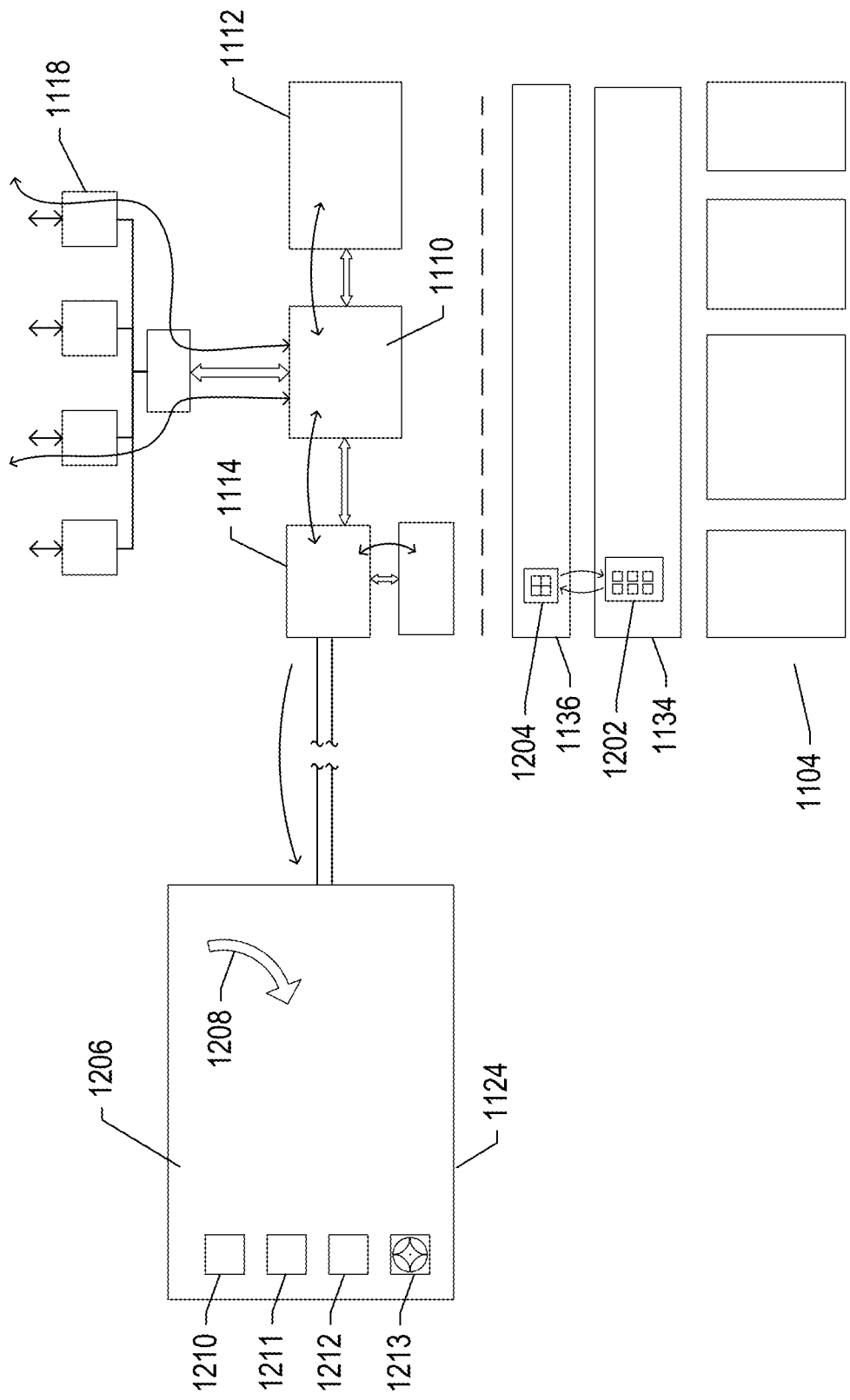
FIGS. 12A-E illustrate application-program execution within the application-program-execution environment illustrated in FIG. 11.

FIGS. 12A-E illustrate application-program execution within the application-program-execution environment illustrated in FIG. 11. FIGS. 12A-E use the same illustration conventions used in FIG. 11. In FIG. 12A, various operating-system routines, represented by rectangles 1202, within the operating system 1134 execute in cooperation with lower-level virtualization-layer routines 1204 to display a desktop interface 1206 on the display monitor 1124. The desktop interface includes a cursor 1208 and a number of icons 1210-1213 through which a user can launch execution of various different application programs. The process carried out by the routines 1202 and 1204 within the operating-system layer 1134 and the virtualization layer 1136 involve execution of thousands of computer instructions by the one or more processors 1110, transfer of computer instructions and data from memory 1112 to the one or more processors 1110, transfer of computer instructions and data from a mass-storage device controlled by controller 1118 to the one or more processors 1110 and memory 1112, and transfer of data and commands from the one or more processors to the video controller 1114, resulting in subsequent transfer of data and commands from the video controller to the display monitor 1124. Thus, while the display of a simple desk-top user interface on a display monitor appears to be a trivial and near instantaneous operation, the operation involves enormous numbers of computer-instruction executions, large volumes of data transfer, and concurrent and simultaneous operation of many different hardware components and of computational entities in the computer-instruction-implemented portion 1104 of the application-program-execution environment.

Figure 12B:
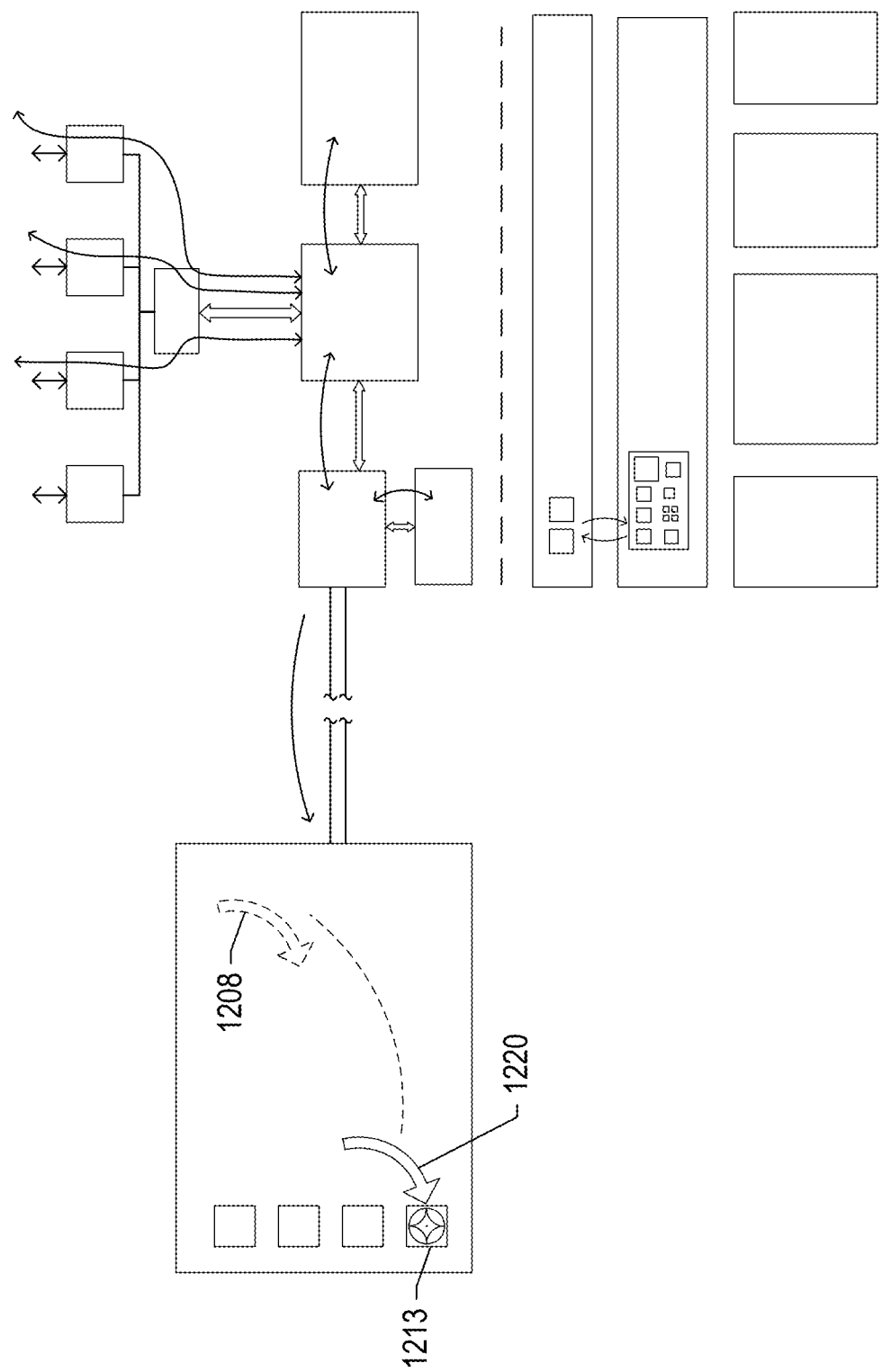

Next, as shown in FIG. 12B, a user employs mouse and/or keyboard operations to move the cursor from its initial position 1208 to a new position 1220, where it overlays an application-program icon, and to input an application-launch command via the mouse and/or keyboard to the operating system. As shown in the right-hand portion of FIG. 12B, this simple application-launching operation carried out by the user also involves execution of many different operating-system and virtualization-layer routines, execution of many thousands to millions or more computer instructions, and significant amounts of data transfer between the various different components of the hardware portion of the application-program-execution environment.

Figure 12C:
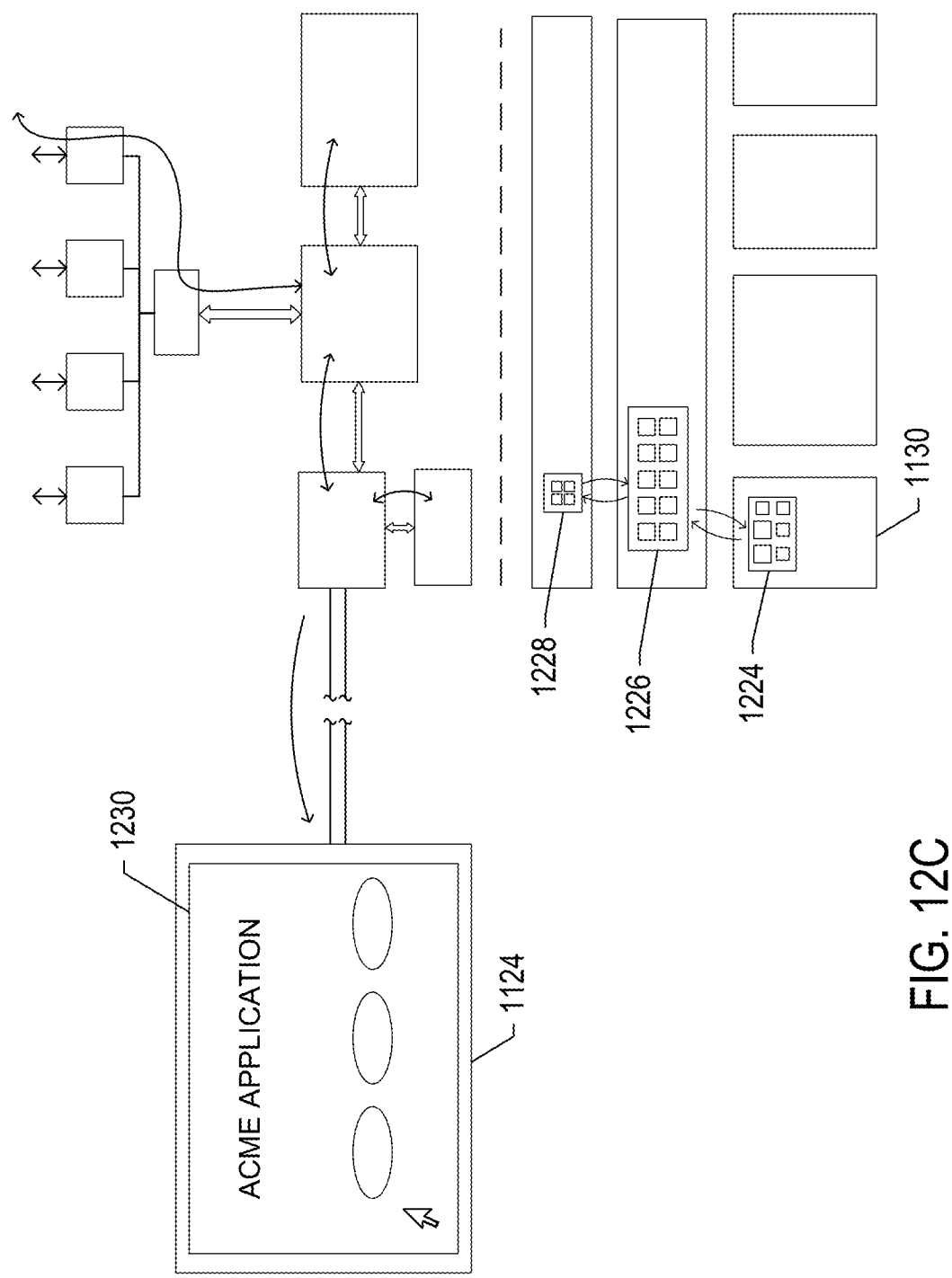
Figure 12D:
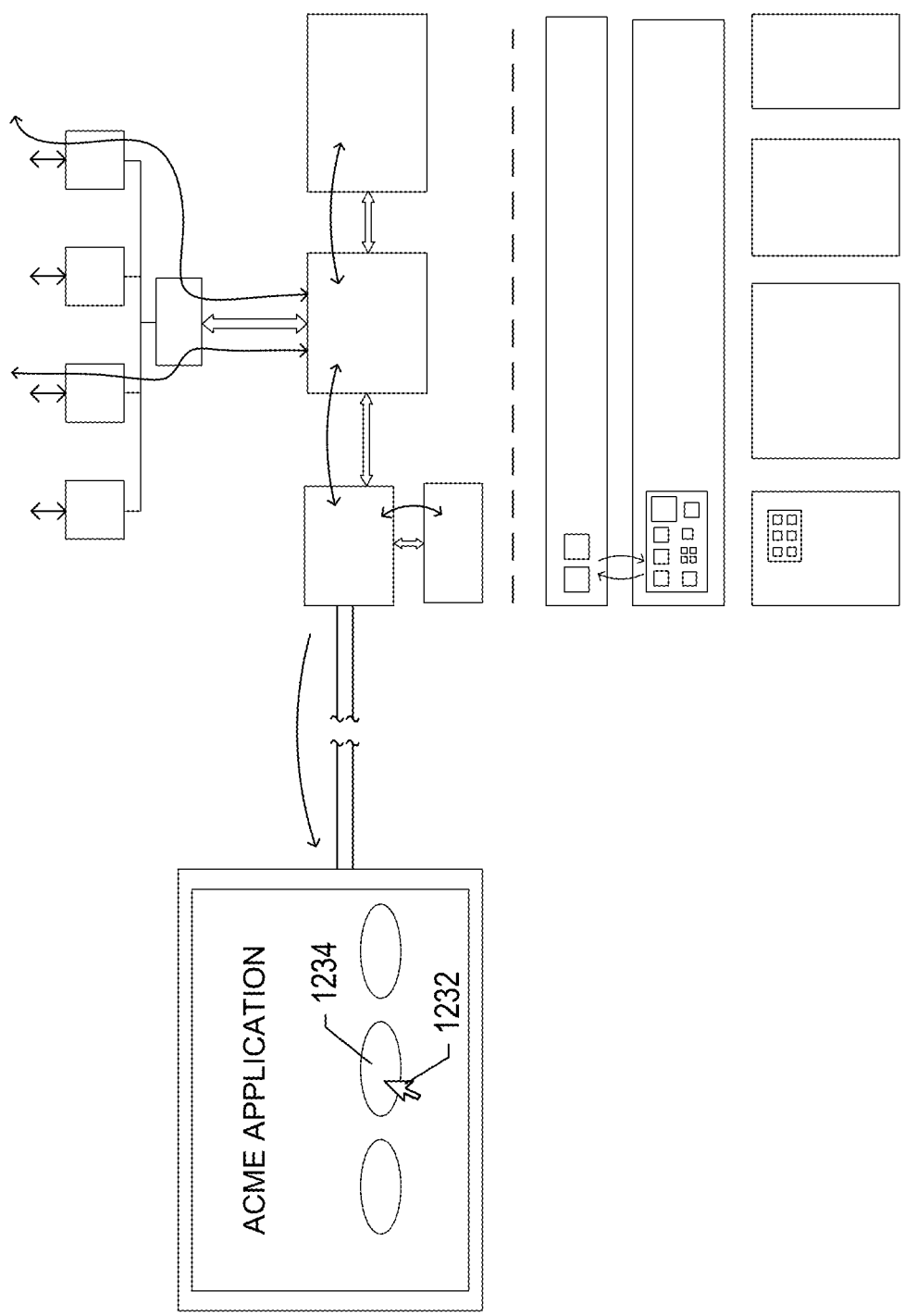

As shown in FIG. 12C, once the application program 1130 begins execution, large numbers of application-program routines 1224, operating-system routines 1226, and virtualization-layer routines 1228 execute and cooperate to display an initial application-program user interface 1230 on the display monitor 1124. Then, as shown in FIG. 12D, the user moves an application-program-displayed cursor 1232 over a menu selection feature 1234 in order to launch a particular application-program operation using mouse clicks and/or keyboard input. Again, simply moving the cursor to a menu-selection feature and invoking an application-program operation involves execution of large numbers of application-program, operating-system, and virtualization-layer routines as well as execution of millions, tens of millions, or more computer instructions, transfer of data among various hardware components, and other complex internal operations.

Figure 12E:
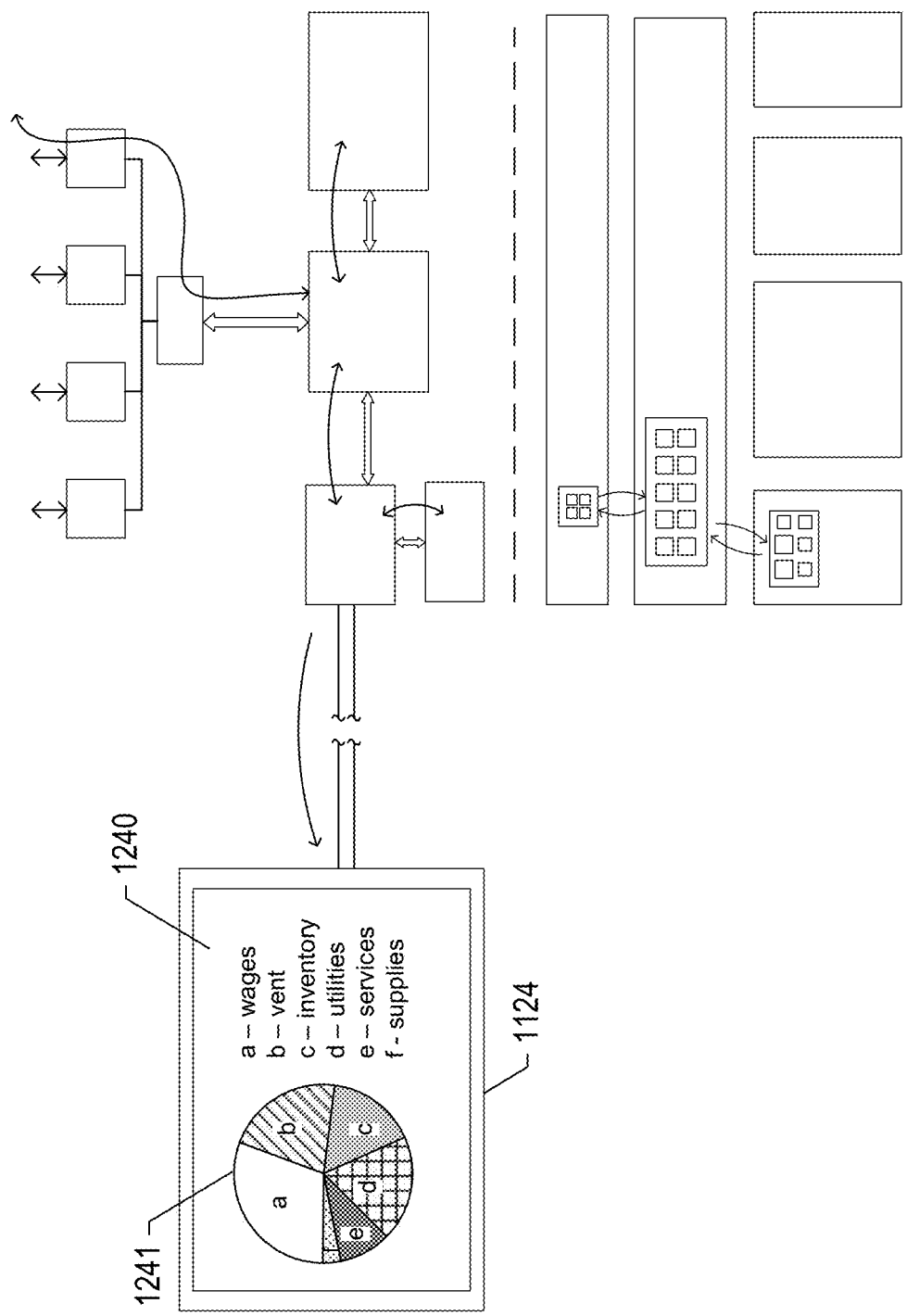

Finally, as shown in FIG. 12E, the application program finishes carrying out the operation launched by the user through the application-program user interface and displays results of the operation 1240 on the display monitor 1124. From a user standpoint, launching an application and then invoking application-provided functionality through an application-program user interface may seem to be relatively trivial operations, but within the computer system, the seemingly trivial operations involve many different hierarchical levels of hardware and computer-implemented-portion components, execution of millions or even billions of computer instructions, and transfer of large volumes of data. In the case of an application program running on a cloud-computing facility and transferring data for the application-program user interface to a remote user computer, the simple operations may additionally involve significant additional complexities, execution of many additional millions of computer instructions, and the cooperative interaction of large numbers of additional computer systems and electronic devices across a potentially large geographical area. The response time for operation completion perceived by the user may be relatively short, even when the application program executes remotely on a cloud-computing facility. However, even relatively minor increases in the response time, from, for example, a fraction of a second to 10 seconds, can render a user's experience annoying or completely unsatisfactory, since the cumulative effect of increased response time over an entire interaction between a user and application program may be quite significant. In cases where the application program controls external devices and systems, even slightly increased response time can render the system, as a whole, inoperable. Thus, monitoring the response times of application programs to user inputs is a critically important task for application-program developers and application-services providers, and the number of contributing factors to application program response times may be quite large, involving many different hierarchically organized components within one or more computer systems and large numbers of dynamic and highly interdependent operations, and details of the execution of billions and billions of computer instructions.

Figure 13A:
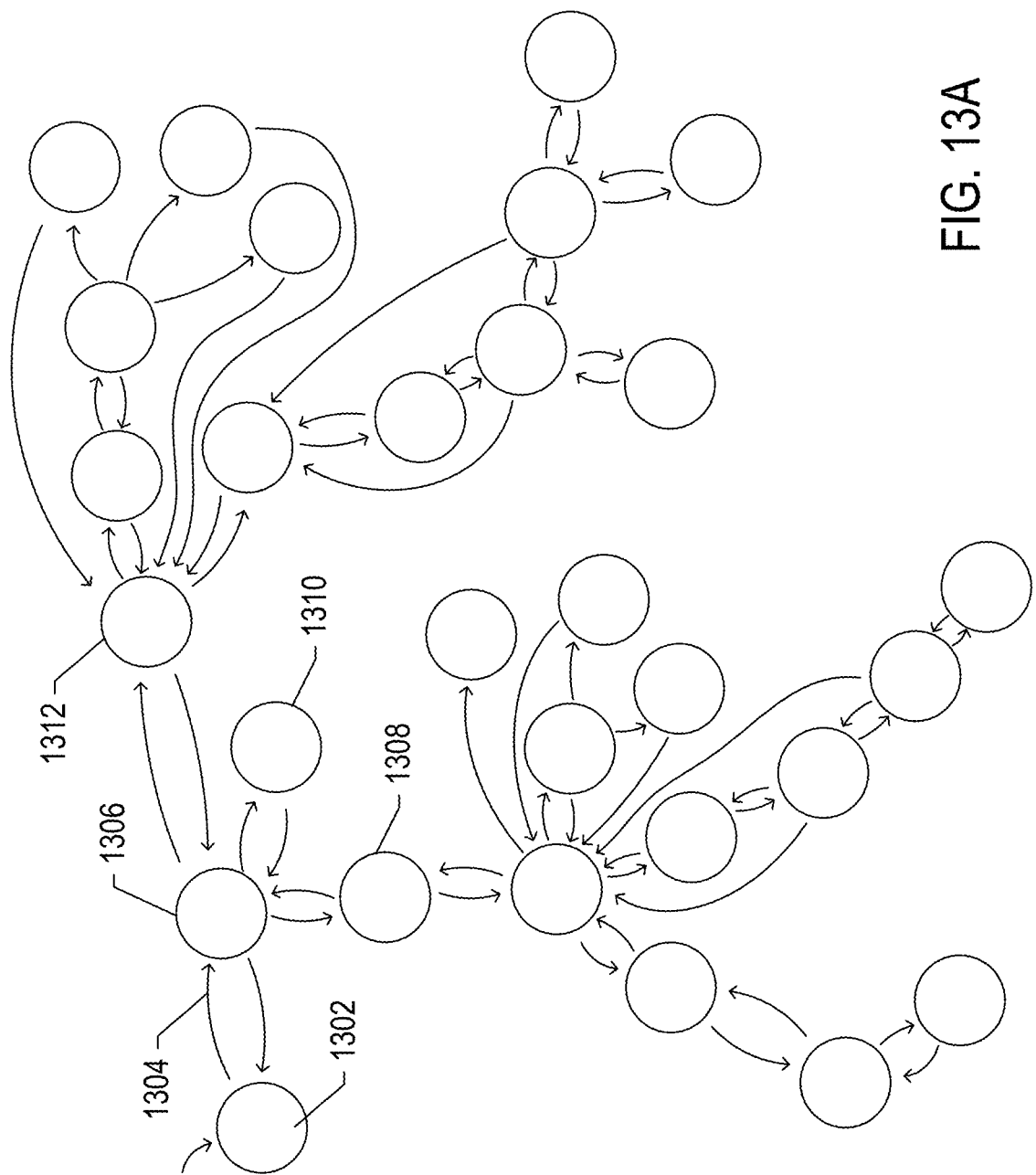
FIGS. 13A-C illustrate an application-program-state-based approach to characterizing the operation of an application program.
Figure 13B:
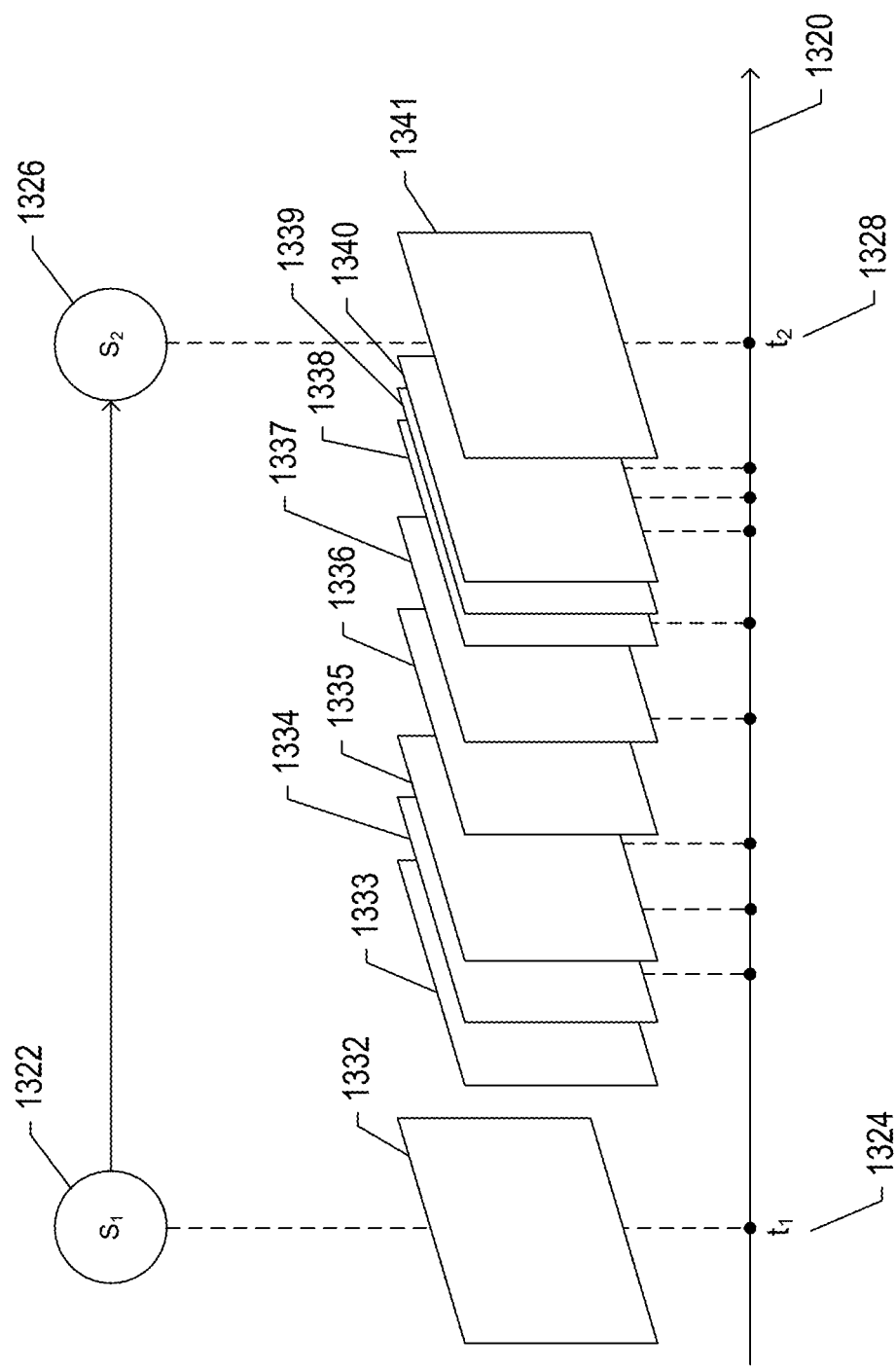
Figure 13C:
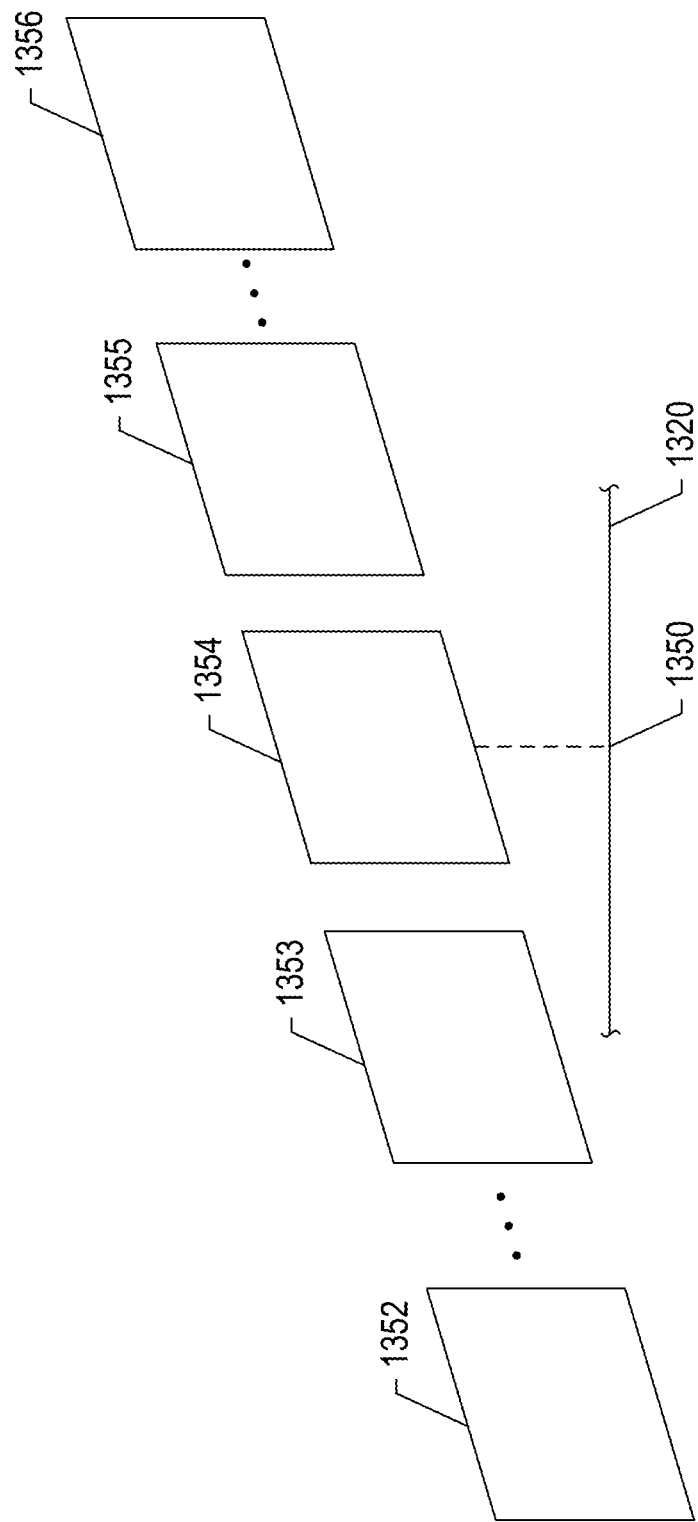

FIGS. 13A-C illustrate an application-program-state-based approach to characterizing the operation of an application program. In FIG. 13A, operation of a simple application program is represented by a state-transition diagram. In this diagram, application-program states are represented by circular nodes, such as node 1302, and transitions between states are represented by curved arrows, such as curved arrow 1304. Determination of the states that together comprise a state space corresponding to operation of an application-program is, to some extent, arbitrary. In the current discussion, the different application-program states may correspond to time periods during which the user interface displayed by the application program is relatively static and the application program is waiting for additional user input in order to carry out additional operations. Thus, for example, state 1302 may correspond to display of an initial application-program user-interface screen featuring a rotating image representing progress as the application program is launched and configured while state 1306 corresponds to the initial menu screen (1230 in FIG. 12C) displayed by the application program after it is up and running. States 1308, 1310, and 1312 may represent the data displayed as a result of invoking the 3 different menu-selection features, and the additional states in the state-transition diagram may be reached by input of additional commands or series of commands through the application-program user interface.

FIG. 13B illustrates a state transition corresponding to an application-program operation. In FIG. 13B, a horizontal timeline 1320 represents the passage of time. The application program inhabits a first state 1322 at time $t_1$ and inhabits a second state 1326 at time $t_2$ 1328. The transition from the first state 1322 to the second state 1326 may occur as a result of user input through the application-program user interface at time $t_1$ 1324. During the transition from the first state to the second state, the application-program user interface may change, as represented by a series of different displayed-information states 1332-1341. In this example, the user interface is altered by a series of discrete changes over the $t_1$-$t_2$ time interval. In other cases, the user interface may be constant over the time interval and change only when the application program transitions to the second state 1326, in which case the intervening display states 1333-1340 would not occur. In still other cases, the user interface may continuously change, in which case there may be as many intervening display states as the length of the time interval for the state transition divided by the refresh rate of the display screen. As discussed above, the state transition is carried out, within the computer system, by millions, billions, or more computer-instruction executions and many data-transfer operations.

As shown in FIG. 13C, the situation is even more complex than illustrated in FIG. 13B, because, at any particular point in time 1350 along the horizontal time axis 1320, there may be many different possible displayed-information states 1352-1356 for the display state that occurs at time 1350. For example, at time 1350, the application program may display a representation of data computed by a data-processing operation, as in FIG. 12E. However, depending on the data that is being rendered, various application-program-configuration parameters, and a variety of concurrent and simultaneous operations of other application programs and the operating system that are reflected in portions of the display-monitor screen outside of the portion of the display-monitor screen devoted to display of the application-program user interface, the appearance of the display monitor may vary considerably, even though time point 1350 corresponds to a well-defined application-program state and a well-defined display-state. In other words, the information contents of the displayed application-program user interface correspond to the current state of the application program, but the information content may be displayed in many different ways, and the display states of the remaining portions of the display monitor may have an essentially arbitrary appearance. Using the example of FIG. 12E, the size of the pie chart 1241 may vary, the colors, types of visual texturing, and other display features used to differentiate the different wedges within the pie chart may differ, the font sizes of the text may differ, the number and size as the wedges may differ for different data processed in the application-program operation, and all portions of the display monitor not occupied by the application-program user-interface, including the desktop background, may have an enormous number of alternative appearances depending on the particular invocation of the application program.

Figure 14:
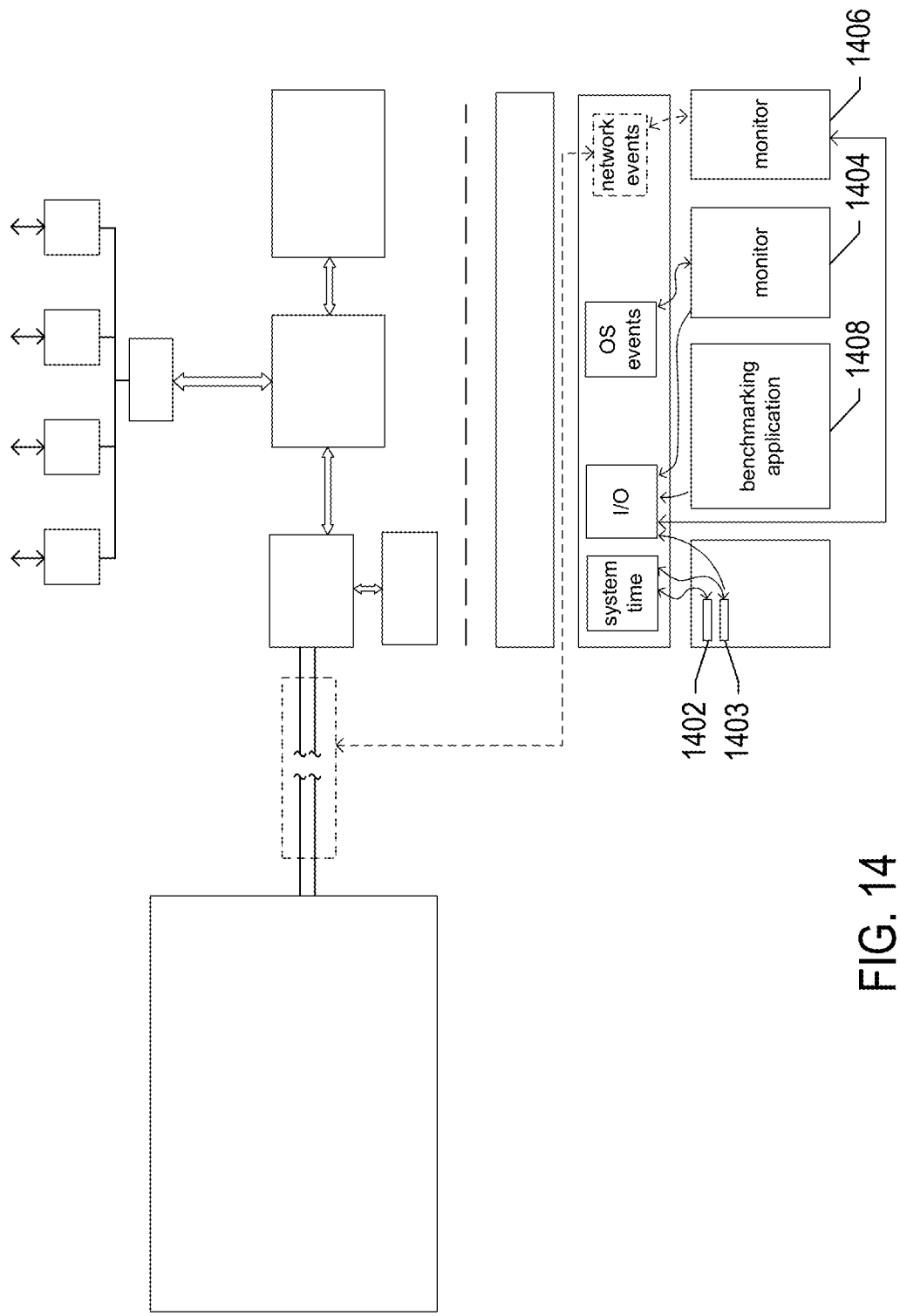
FIG. 14 illustrates various traditional approaches to performance monitoring of application programs.

FIG. 14 illustrates various traditional approaches to performance monitoring of application programs. In one approach, instrumentation code is introduced into the application-program code 1402-1403. For example, the first block of instrumentation code 1402 may access an operating-system system-time routine to determine and store the current time when code that executes upon user input to the application-program user interface begins to execute and a second block of instrumentation code 1403 again accesses the operating-system system-time routine to determine the current time when code that executes upon completion of an operation launched by the user input, then determines the elapsed time for the operation from the stored time and the most recently determined time, and then outputs the computed elapsed time to memory and/or a mass-storage device for later reporting or use in computing an overall response-time measurement for the application-program operation. There are many problems associated with instrumenting application-program code, not the least of which is that those who insert instrumentation code into application-program code need to well understand the application-program code, which, due to the complexity of modern applications, is generally not the case. Other problems may arise due to various types of latencies that contribute to user-perceived application-program response times that cannot be measured by instrumentation code. In modern computing environments, for example, in which many different concurrently and simultaneously executing programs share the computational resources of a computer system, and when application programs may rely on asynchronous execution of external computational entities, there may be significant latencies that occur outside of the application program that cannot be measured by instrumentation introduced into the application program, such as expiration of an execution time slice just after instrumentation code is executed, but before the instructions involved in operation completion can be executed. As another example, the time elapsed between beginning an operation and outputting the application-program user-interface display changes indicating completion of the operation may not reflect the response time perceived by a user in the case that the application program is running remotely in a cloud-computing environment and transmission of application-program user-interface display changes through local and wide-area networks may introduce latencies equal to, or greater than, the elapsed time for carrying out the operation by the remotely executing application program.

Another traditional approach for application-performance monitoring is to use client-side or server-side monitoring 1404, often based on operating-system performance-monitoring tools that rely on system events to attempt to measure the elapsed time between user input to the application program that initiates an application-program operation and events, such as information transmission or display-monitor changes, that represent operation completion. Unfortunately, as the complexity of computer systems, operating systems, and virtualized environments increases, many of the traditionally used operating-system functionality may no longer be available or may not provide the precision and repeatability needed for meaningful performance analysis. Yet another traditional approach is to monitor network events 1406, particularly in the case that the application program executes on a remote cloud-computing environment and transfers data through network communications to a client computer. Here again, in complex modern computing environments, there may be many additional latencies beyond those related to reception of data from the network, the contribute significantly to perceived response time for application-program operations that cannot be reliably measured by this approach. Finally, application-program performance monitoring may employ benchmarking applications 1408, implemented as scripts, that repeatedly and automatically exercise application programs and collect performance-related data, but here again, the types of data collected during benchmarking may not provide accurate measurements of application-program response times perceived by human users.

Figure 15:
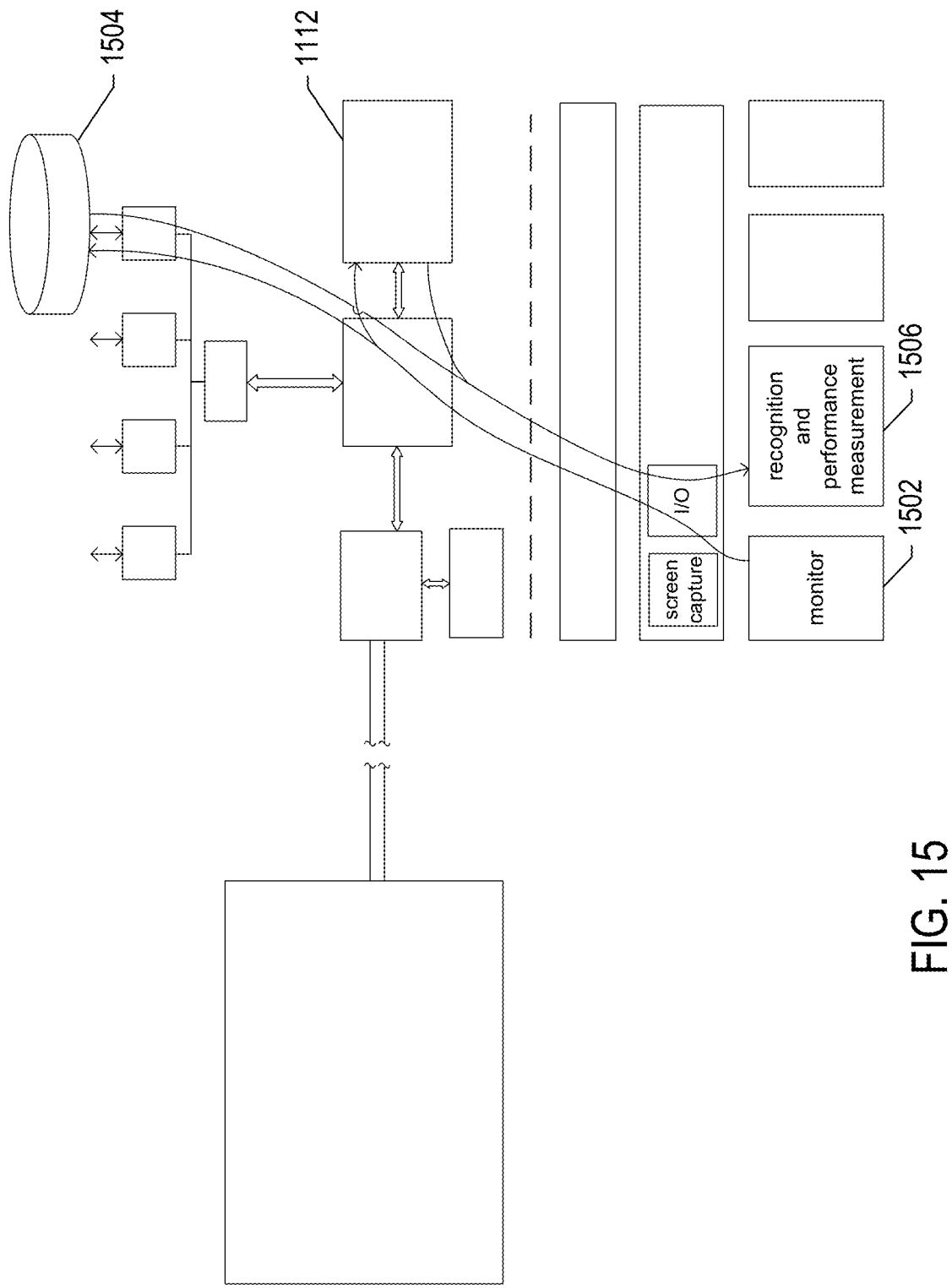
FIG. 15 illustrates the general approach to application-program performance measurement taken by the currently disclosed methods and systems.

FIG. 15 illustrates a general approach to application-program performance measurement taken by the currently disclosed methods and systems. The currently disclosed methods and systems employ a user-interface monitor 1502 to continuously or periodically obtain screenshots from the display monitor and store the screenshots, annotated with timestamps and other information, in one or more of memory 1112 and mass storage 1504. In certain implementations, the captured screen images may be initially processed by the user-interface monitor to facilitate subsequent image-processing and image-recognition tasks. In addition, as discussed further below, the user-interface monitor may additionally capture various types of timestamped events, such as mouse clicks or keyboard-input events, that provide additional information about application-program states and state transitions. The currently disclosed methods and systems employ recognition and performance-measurement functionalities 1506 to analyze the information collected by the user-interface module to determine the elapsed times of application-program operations. This approach directly corresponds to how human users perceive application-program response time based on changes to the application-program user interface. This approach does not involve instrumenting or otherwise changing the application programs, and therefore does not require knowledge of their internal structures and implementations, and avoids the need to consider various types of latencies introduced by entities and operations external to application-program execution.

Figure 16A:
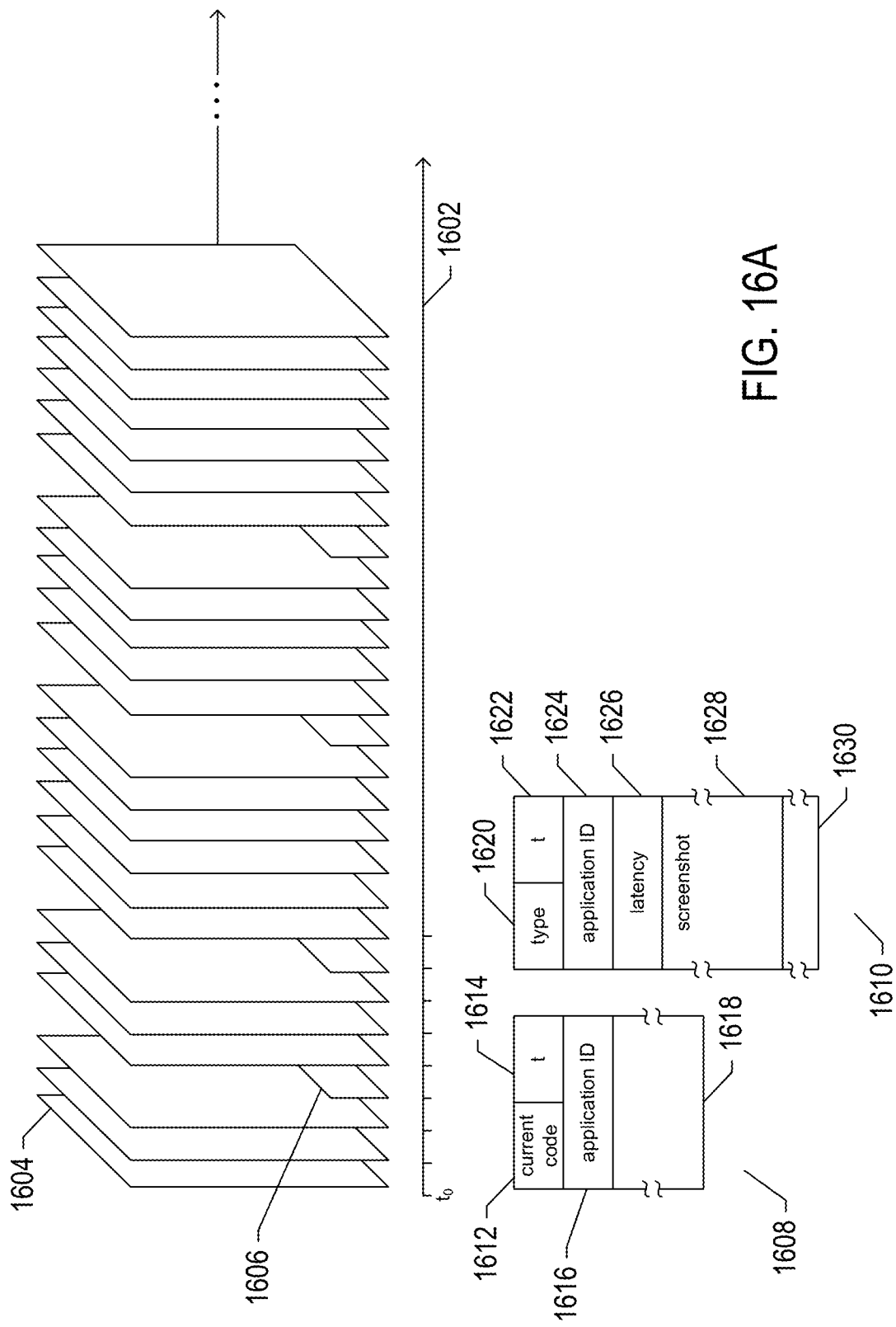
FIGS. 16A-B illustrate the general approach to performance monitoring employed by the currently disclosed methods and systems, discussed with reference to FIG. 15, from the standpoint of data collection and data processing.
Figure 16B:
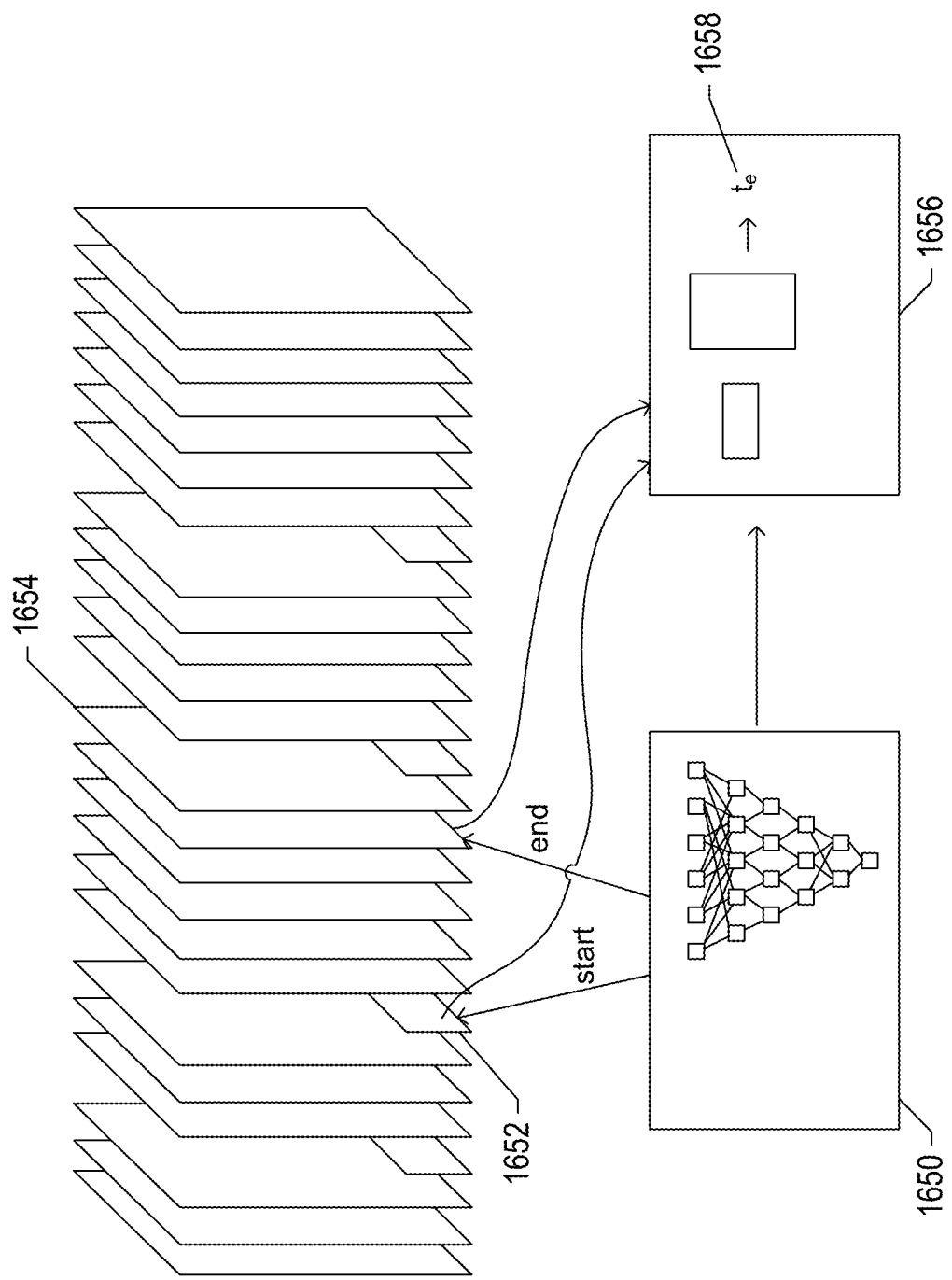

FIGS. 16A-B illustrate the general approach to performance monitoring employed by the currently disclosed methods and systems, discussed above with reference to FIG. 15, from the standpoint of data collection and data processing. FIG. 16A illustrates the data collected by the user-interface monitor during application-program execution. The collected data is organized along a horizontal timeline 1602. The collected data includes screen-capture images, such as screen-capture image 1604, and other types of user-interface events related to application-program states and state transitions, such as event 1606. In FIG. 16A, the data appears to be collected at regular intervals in time, but this is not generally the case, particularly for user-interface events, such as mouse clicks or keyboard input. Of course, there are many opportunities for data compression. It may, for example, be possible to store only screen-capture images when the displayed information changes, rather than continuously or at fixed intervals. The collected data may be viewed as data structures 1608 and 1610. User-interface events may be stored as user-event data structure 1608 that include an indication of the event type 1612, a timestamp 1614, and a process ID or other indication or identifier that can be correlated with the particular application program to which the event corresponds 1616. Many additional types of information may be included in the data structure, including a latency estimate. A screen-capture-image data structure 1610 may include an indication of the type of image 1620, a timestamp 1622, information that can be used to determine the particular application program related to the screen capture 1624, in certain implementations, an estimated latency for the screen capture 1626, and the screen-capture image or a reference to a file or container in which the screen-capture image is stored 1628. The screen-capture-image data structure may additionally include other types of information 1630.

As shown in FIG. 16B, a recognizer 1650 is employed to identify those stored data structures corresponding to the initial application state 1652 and the final application state 1654 corresponding to an application-program operation for which response-time measurements are compiled. A performance-measurement entity 1656 then uses the timestamps associated with the identified data structures, along with data-collection-latency estimates included in the data structures, to compute an estimated elapsed 1658 for the application-program operation. For example, the recognizer 1650 may be trained to identify screen-capture images corresponding to the user interface displayed in FIG. 12B, where an application is launched, and the screen-capture image shown in FIG. 12C, where the application program displays an initial screen. The elapsed time computed by the performance-measurement entity is a measure of the response time for the operation of launching the application from a desktop icon. Alternatively, the performance-measurement entity may employ a timestamped user mouse click, alone or in combination with a screen-capture image corresponding to display-monitor state shown in FIG. 12B, as the indication of the start time for the application-invocation operation. In certain implementations, additional intermediate states within the time span of an operation may be identified, and elapsed times for transitions between such intermediate states may be measured and reported.

Figure 17A:
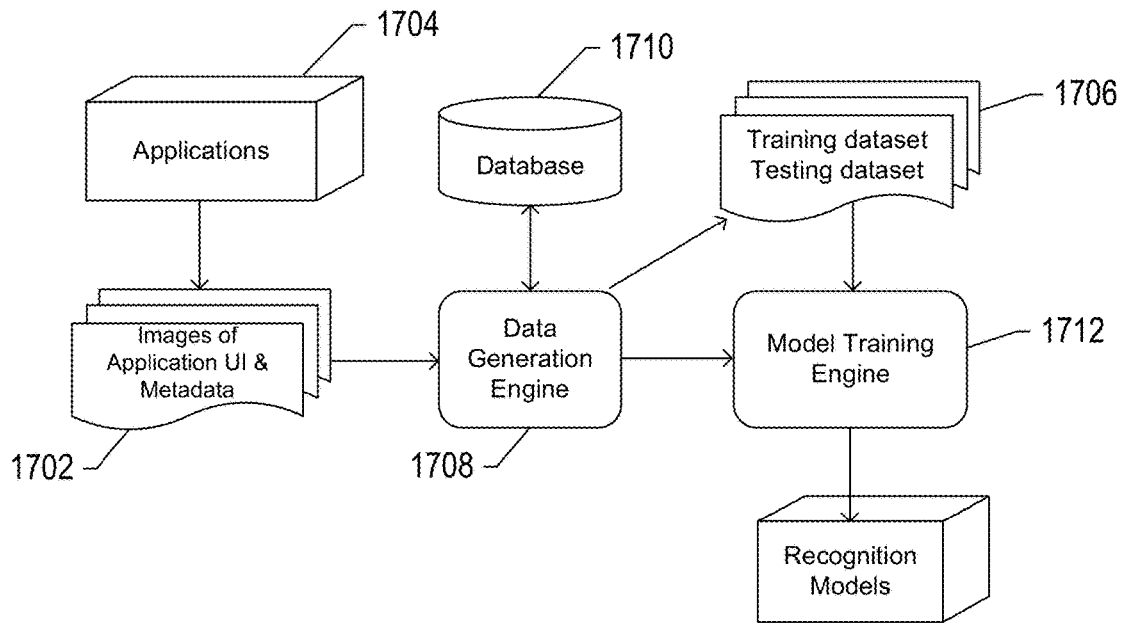
FIGS. 17A-B illustrate one implementation of the currently disclosed application-program performance-monitoring system.
Figure 17B:
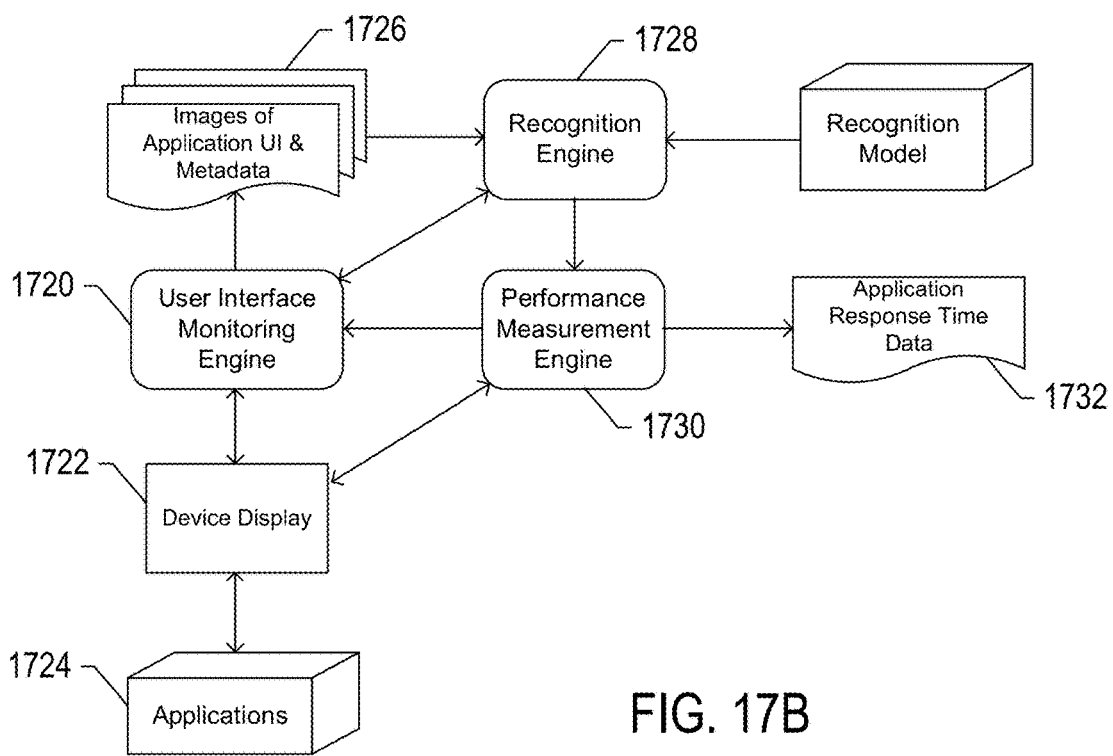

FIGS. 17A-B illustrate one implementation of the currently disclosed application-program performance-monitoring system. FIG. 17A shows a recognition-model-generation subsystem of the currently disclosed application-program performance-monitoring system. The recognition-model-generation subsystem processes screen-capture images and associated metadata 1702 generated by application programs 1704 to generate training data sets 1706. The screen-capture images and associated metadata 1702 are processed by a data-generation engine 1708 to produce a large database 1710 of actual screen-capture images and additional screen-capture images generated from the actual screen-capture images by a variety of different types of modifications carried out by the data-generation engine. These modifications may include changing the sizes of features in the screen-capture image, altering the background colors and textures, translating portions of the images, varying image resolution and quality, modifying feature colors, text fonts and formats, and other such image characteristics, and even introducing random noise into the images. The data-generation engine thus efficiently provides greater volumes of training data than can be easily obtained from actual user-interface screen captures. The training data 1706 is then used for training recognizers to recognize images corresponding to particular application-program states by a model training engine 1712.

FIG. 17B shows the performance-monitoring subsystem of the application-program performance-monitoring system. The user-interface monitoring engine 1720 continuously or periodically captures screen-capture images, from a display device 1722 on which application programs 1724 display their user interfaces, and stores the captured screen images, along with additional detected user-interface events, in a data store 1726. A recognition engine 1728 processes the stored data 1726 to identify times corresponding to application-program states which are then used by a performance-measurement engine 1732 to compute estimated elapsed times for application-program operations, which are stored for subsequent use 1732, such as generating reports or for input to higher-level performance-monitoring applications.

Figure 18:
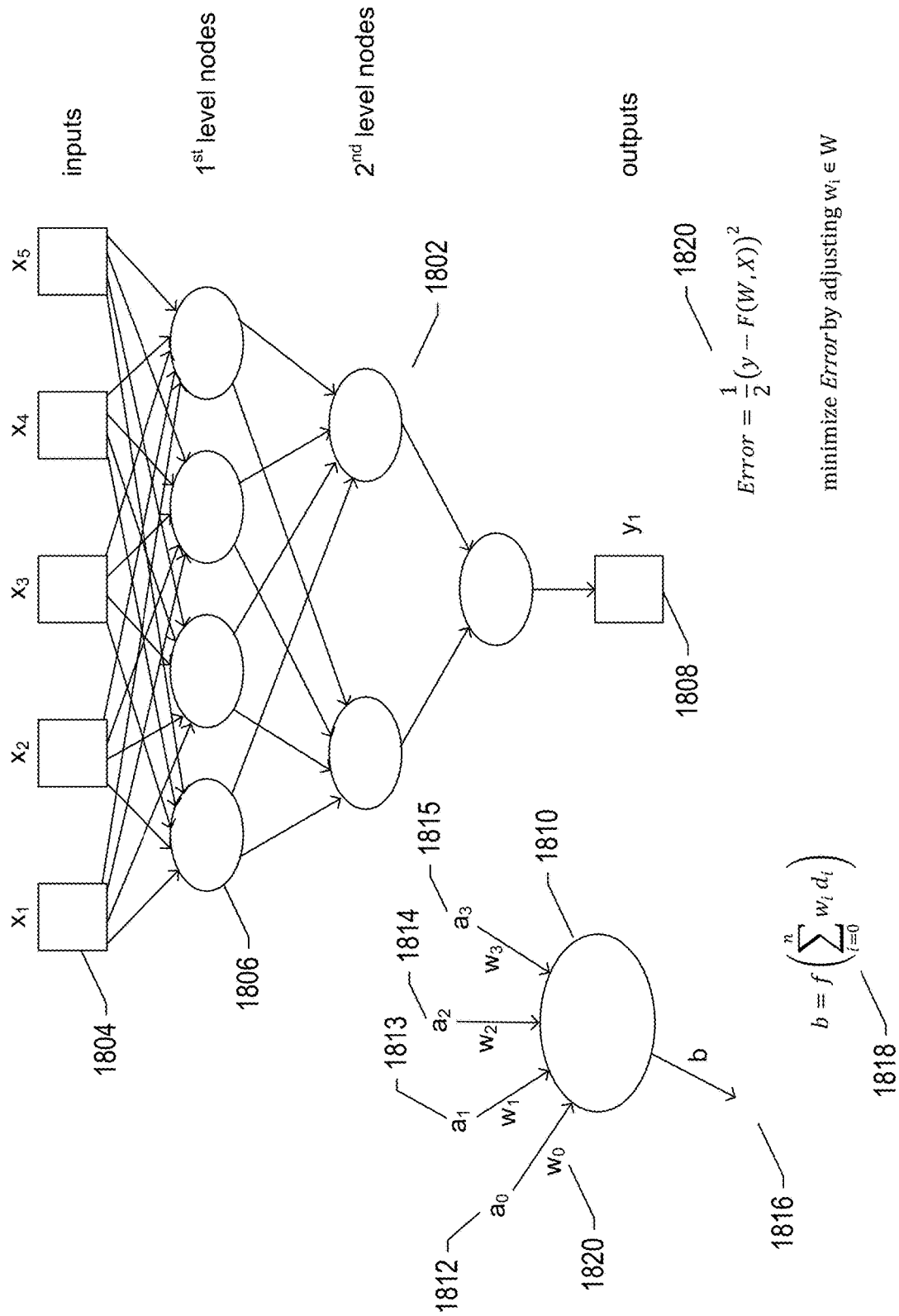
FIG. 18 illustrates a traditional neural network that may be employed as a recognizer.

Various different types of recognizers can be employed by the currently disclosed application-program performance-measuring system to identify screen-capture images corresponding to particular application-program states. FIG. 18 illustrates a traditional neural network that may be employed as a recognizer. The neural network 1802 comprises a set of input nodes, such as input node 1804, one or more levels of hidden nodes, such as hidden node 1806, and one or more output nodes, such as output node 1808. In the case of image processing, the input nodes may correspond to pixel values of an electronic image and the output nodes may correspond to indications of whether the image contains particular types of features or subimages. Each hidden node, such as hidden node 1810, may have multiple inputs 1812-1815 and an output 1816 The output value is computed as a generally nonlinear function of the sum of the weighted input values, as indicated by expression 1818. Note that each input signal is associated with a weight, such as the weight $w_0$ 1820 associated with input signal $a_0$ 1812. The weights are determined through a process of training. The neural network is initially configured with arbitrary weight values. Then, inputs, represented by a vector of input values x, with known desired output values y, are applied to the neural network, and an error is computed, as indicated by expression 1820. The error is then minimized by adjusting the weights assigned to the inputs of the hidden nodes. The weight adjustment can be viewed as an optimization problem. There are many approaches to solving such optimization problems. In many cases, for neural networks, back propagation of computed errors through the network in the direction of output nodes to input nodes and application of a gradient-descent method based on computed partial differentials of the error with respect to the weights can be employed for weight adjustment. The process is repeated for each of the images in the training data set, and additional repetitions of the overall process may be carried out until the weight adjustment converges to produce an acceptable overall error.

Unfortunately, traditional neural networks are often impractical for image processing, because the number of input nodes corresponds to the number of pixels in the images processed by the neural network. The number of weights within the neural network is geometrically related to the number of inputs, and therefore generally for greater than the number of weights that can be efficiently adjusted through a training process. Furthermore, the large number of weights may represent a dramatic overfilling of the parameters of the neural network to the data, as a result of which the neural network may have low predictive power for images to which the neural network is not applied during training.

Figure 19A:
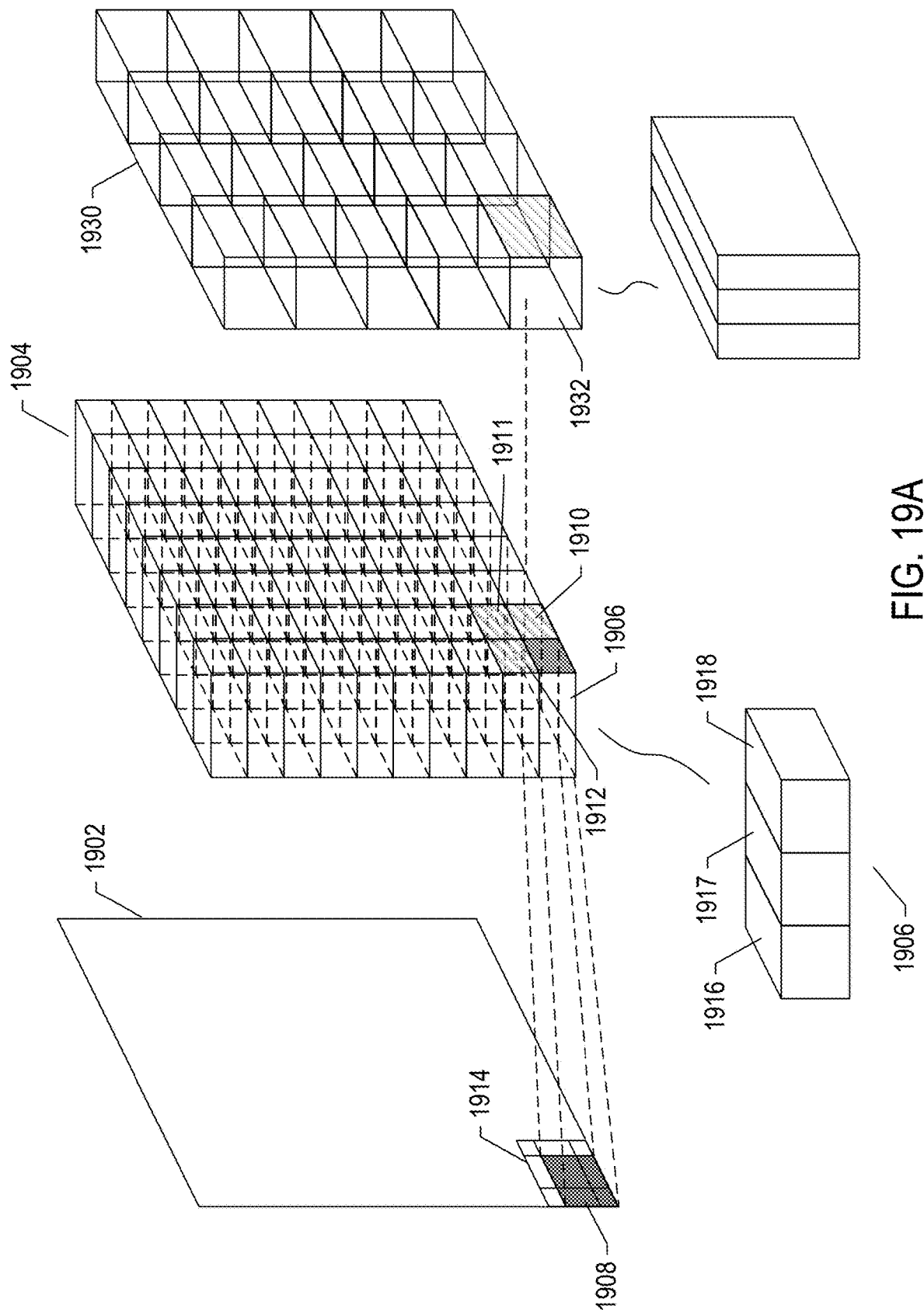
Figure 19C:
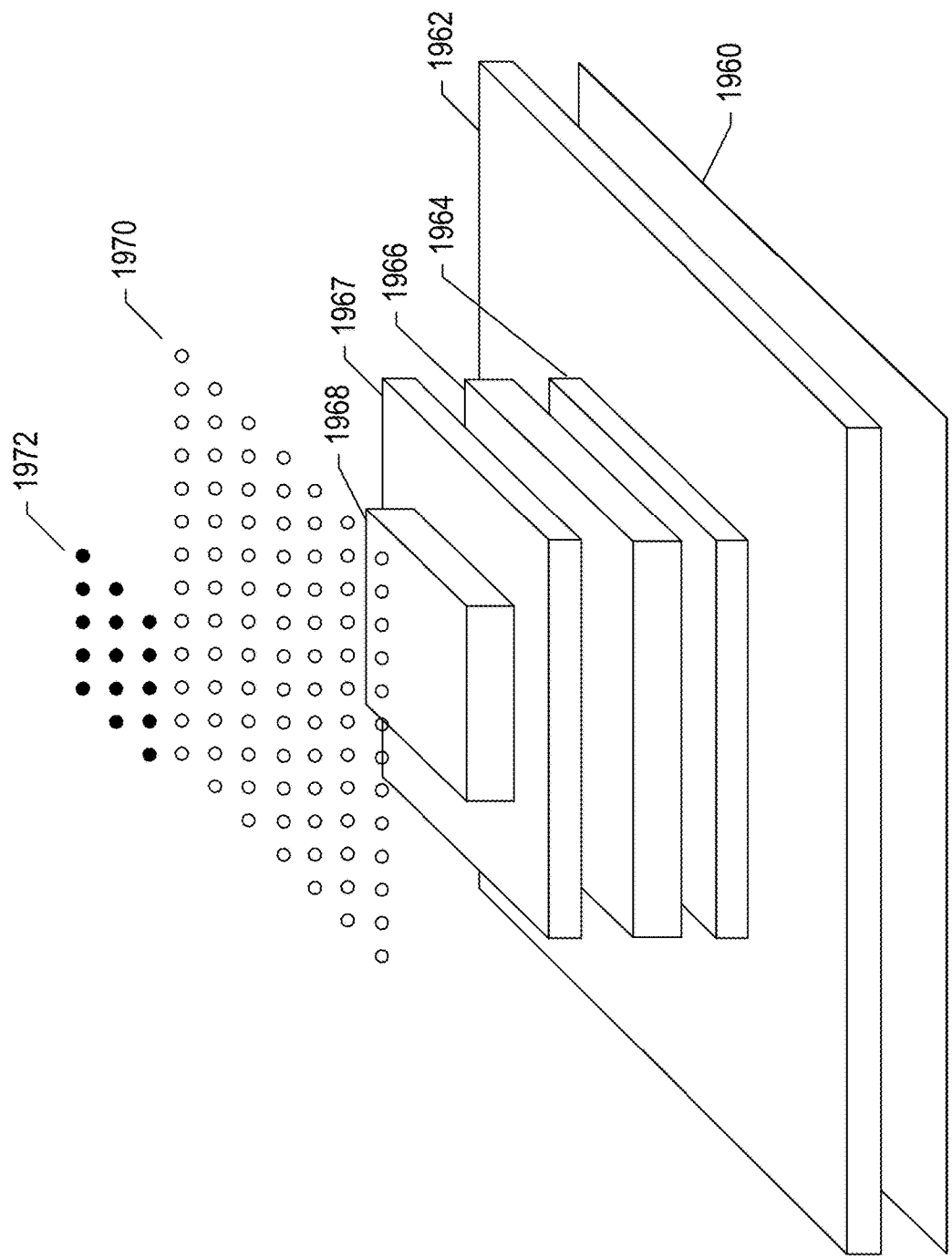

FIGS. 19A-C illustrate a convolutional neural network. Convolutional neural networks are currently used for image processing, voice recognition, and many other types of machine-learning tasks for which traditional neural networks are impractical. In FIG. 19A, a digitally encoded screen-capture image 1902 represents the input data for a convolutional neural network. A first level of convolutional-neural-network nodes 1904 each process a small subregion of the image. The subregions processed by adjacent nodes overlap. For example, the corner node 1906 processes the shaded subregion 1908 of the input image. The set of four nodes 1906 and 1910-1912 together process a larger subregion 1914 of the input image. Each node may include multiple subnodes. For example, as shown in FIG. 19A, node 1906 includes 3 subnodes 1916-1918. The subnodes within a node all process the same region of the input image, but each subnode may differently process that region to produce different output values. Each type of subnode in each node in the initial layer of nodes 1904 uses a common kernel or filter for subregion processing, as discussed further below. The values in the kernel or filter are the parameters, or weights, that are adjusted during training. However, since all the nodes in the initial layer use the same three subnode kernels or filters, the initial node layer is associated with only a comparatively small number of adjustable parameters. Furthermore, the processing associated with each kernel or filter is more or less translationally invariant, so that a particular feature recognized by a particular type of subnode kernel is recognized anywhere within the input image that the feature occurs. This type of organization mimics the organization of biological image-processing systems. A second layer of nodes 1930 may operate as aggregators, each producing an output value that represents the output of some function of the corresponding output values of multiple nodes in the first node layer 1904. For example, second-a layer node 1932 receives, as input, the output from four first-layer nodes 1906 and 1910-1912 and produces an aggregate output. As with the first-level nodes, the second-level nodes also contain subnodes, with each second-level subnode producing an aggregate output value from outputs of multiple corresponding first-level subnodes.

FIG. 19B illustrates the kernel-based or filter-based processing carried out by a convolutional neural network node. A small subregion of the input image 1936 is shown aligned with a kernel or filter 1940 of a subnode of a first-layer node that processes the image subregion. Each pixel or cell in the image subregion 1936 is associated with a pixel value. Each corresponding cell in the kernel is associated with a kernel value, or weight. The processing operation essentially amounts to computation of a dot product 1942 of the image subregion and the kernel, when both are viewed as vectors. As discussed with reference to FIG. 19A, the nodes of the first level process different, overlapping subregions of the input image, with these overlapping subregions essentially tiling the input image. For example, given an input image represented by rectangles 1944, a first node processes a first subregion 1946, a second node may process the overlapping, right-shifted subregion 1948, and successive nodes may process successively right-shifted subregions in the image up through a tenth subregion 1950. Then, a next downshifted set of subregions, beginning with an eleventh subregion 1952, may be processed by a next row of nodes.

FIG. 19C illustrates the many possible layers within the convolutional neural network. The convolutional neural network may include an initial set of input nodes 1960, a first convolutional node layer 1962, such as the first layer of nodes 1904 shown in FIG. 19A, and aggregation layer 1964, in which each node processes the outputs for multiple nodes in the convolutional node layer 1962, and additional types of layers 1966-1968 that include additional convolutional, aggregation, and other types of layers. Eventually, the subnodes in a final intermediate layer 1968 are expanded into a node layer 1970 that forms the basis of a traditional, fully connected neural-network portion with multiple node levels of decreasing size that terminate with an output-node level 1972.

Figure 20:
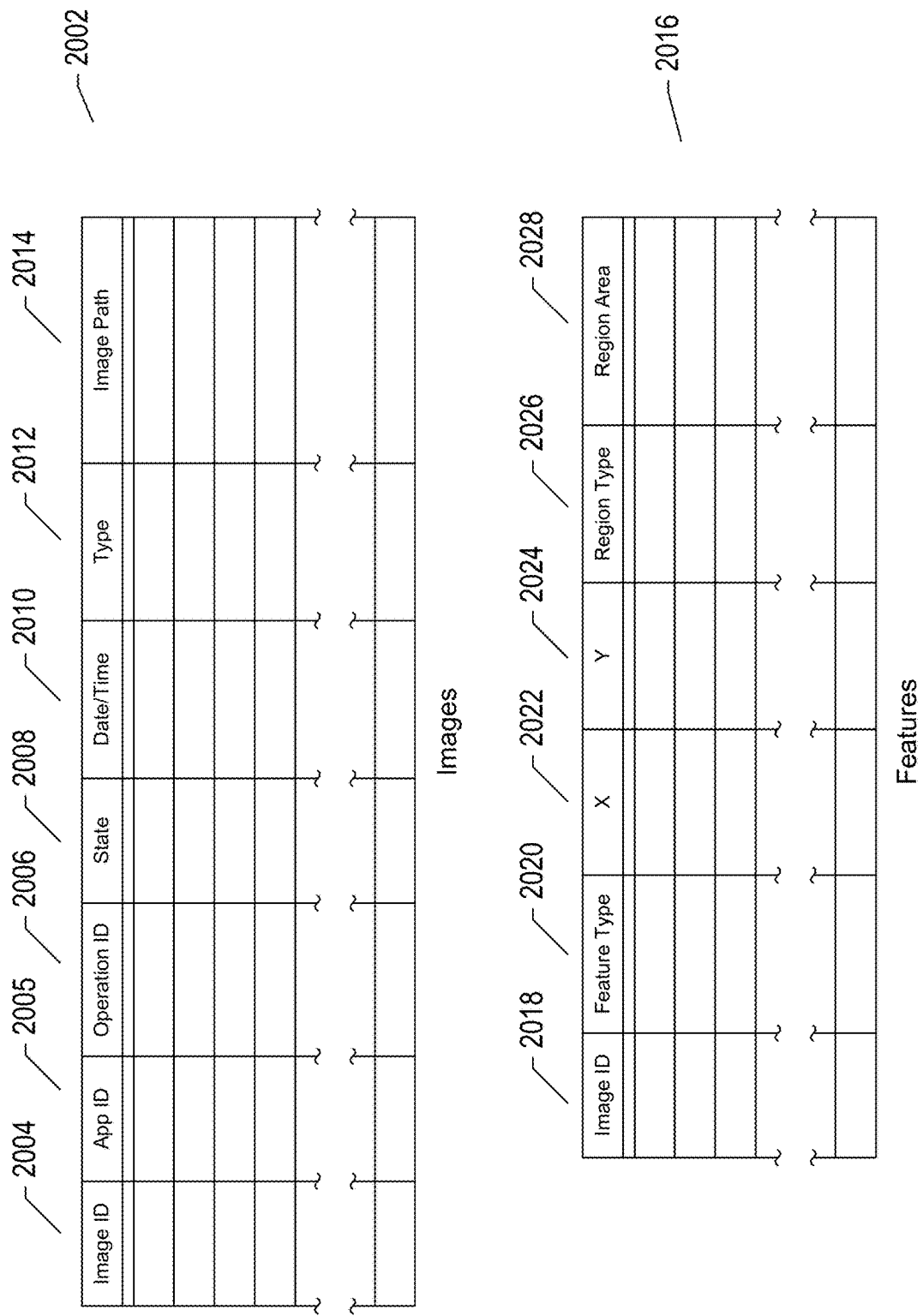
FIG. 20 illustrates example data structures used to store screen-capture images generated by application-program execution (1702 in FIG. 17A) and generated by the data-generation engine (1708 in FIG. 17A) by modifying screen-capture images generated by application-program execution.

FIG. 20 illustrates example data structures used to store screen-capture images generated by application-program execution (1702 in FIG. 17A) and generated by the data-generation engine (1708 in FIG. 17A) by modifying screen-capture images generated by application-program execution. These screen-capture images are used for training recognizers. The screen-capture images may each be represented by a row in a relational database table Images 2002. Each row of the table includes an image identifier 2004, an application identifier 2005, an operation ID 2006 that identifies the application operation performed by a user, an indication of the application state represented by the image 2008, a date and time when the images collected 2010, an indication of the type of image 2012, and a file-directory path for the image file 2014. In addition, to facilitate image modification by the data generation engine, screen-capture images produced by application-program execution may be additionally associated with features, each described by a row within a table Features 2016. These features represent particular portions of the screen-capture image that may be particularly relevant for determination of the application-program state corresponding to the image. Each feature is characterized by an image identifier 2018, a feature type 2020, the image coordinates for the center of the region 2022 and 2024, an indication of the type of region 2026, and an indication of the area of the region 2028. For example, region types may include circle, square, and other regular geometric shapes and feature types may indicate why the subregion is significant, such as subregions containing invariant text or other distinguishing information of particular importance in recognizing the corresponding application-program state.

Figure 21A:
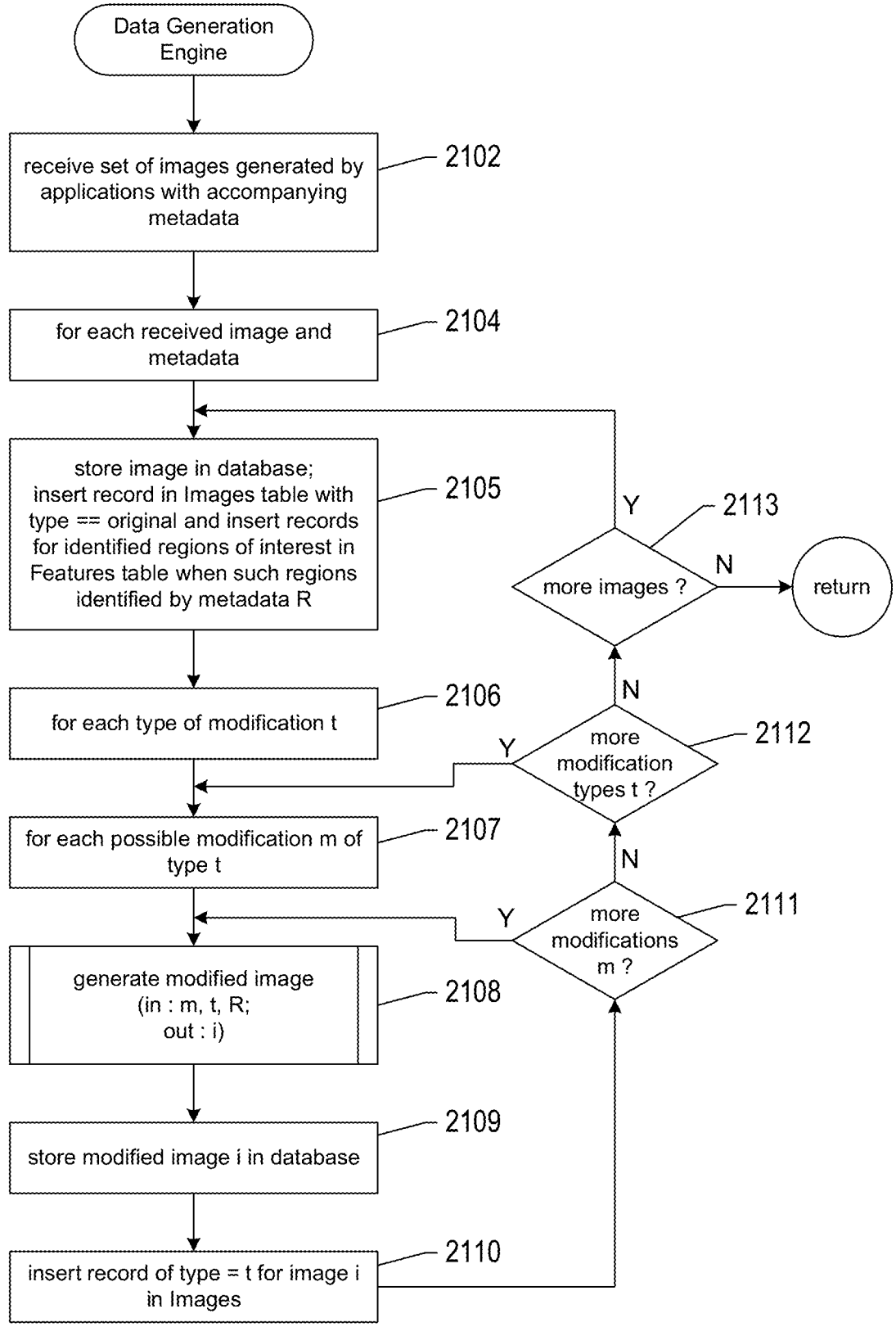
FIGS. 21A-C provide control-flow diagrams that illustrate an example implementation of the recognition-model-generation subsystem of the currently disclosed application-program performance-monitoring system.
Figure 21B:
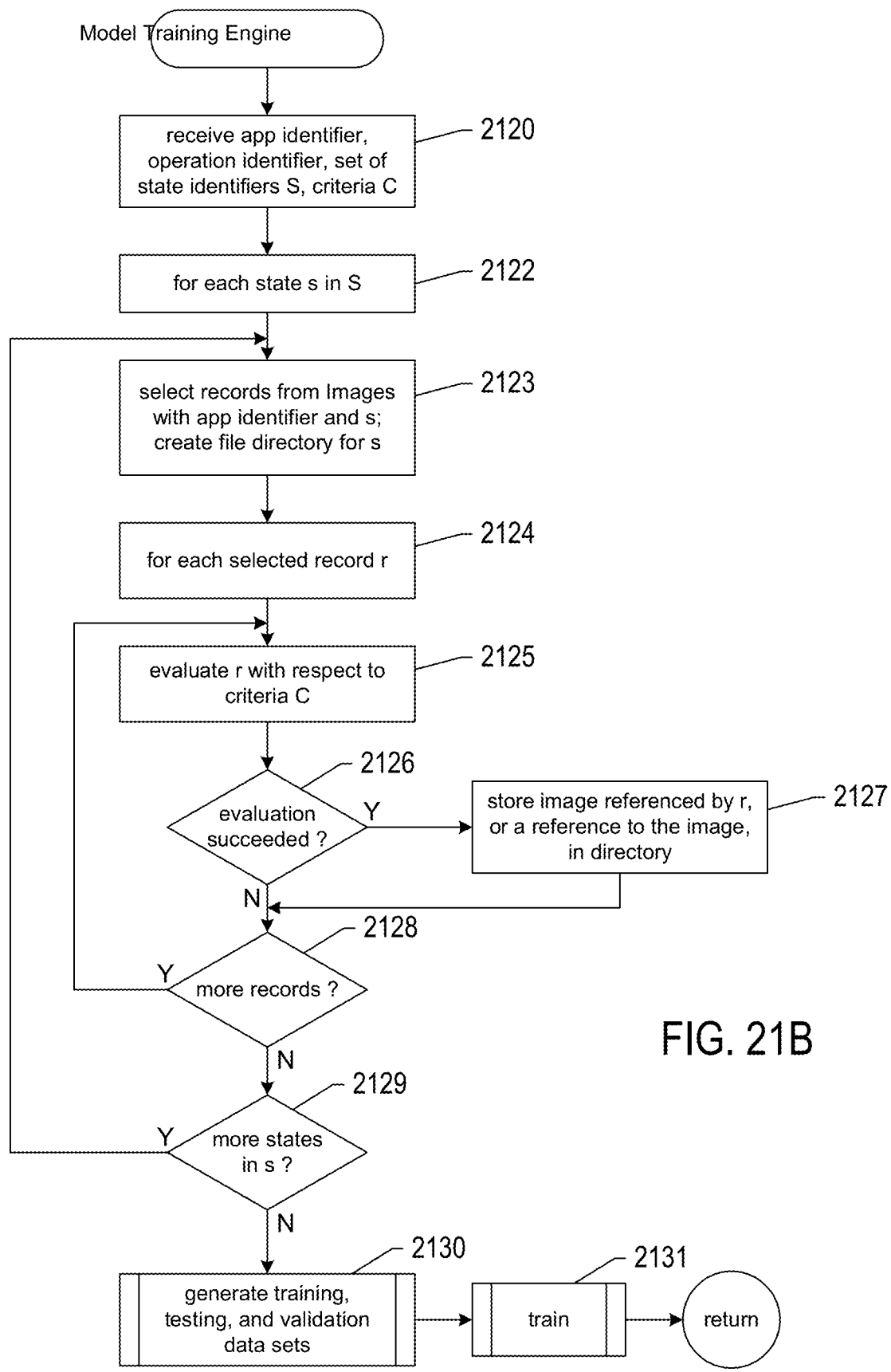
Figure 21C:
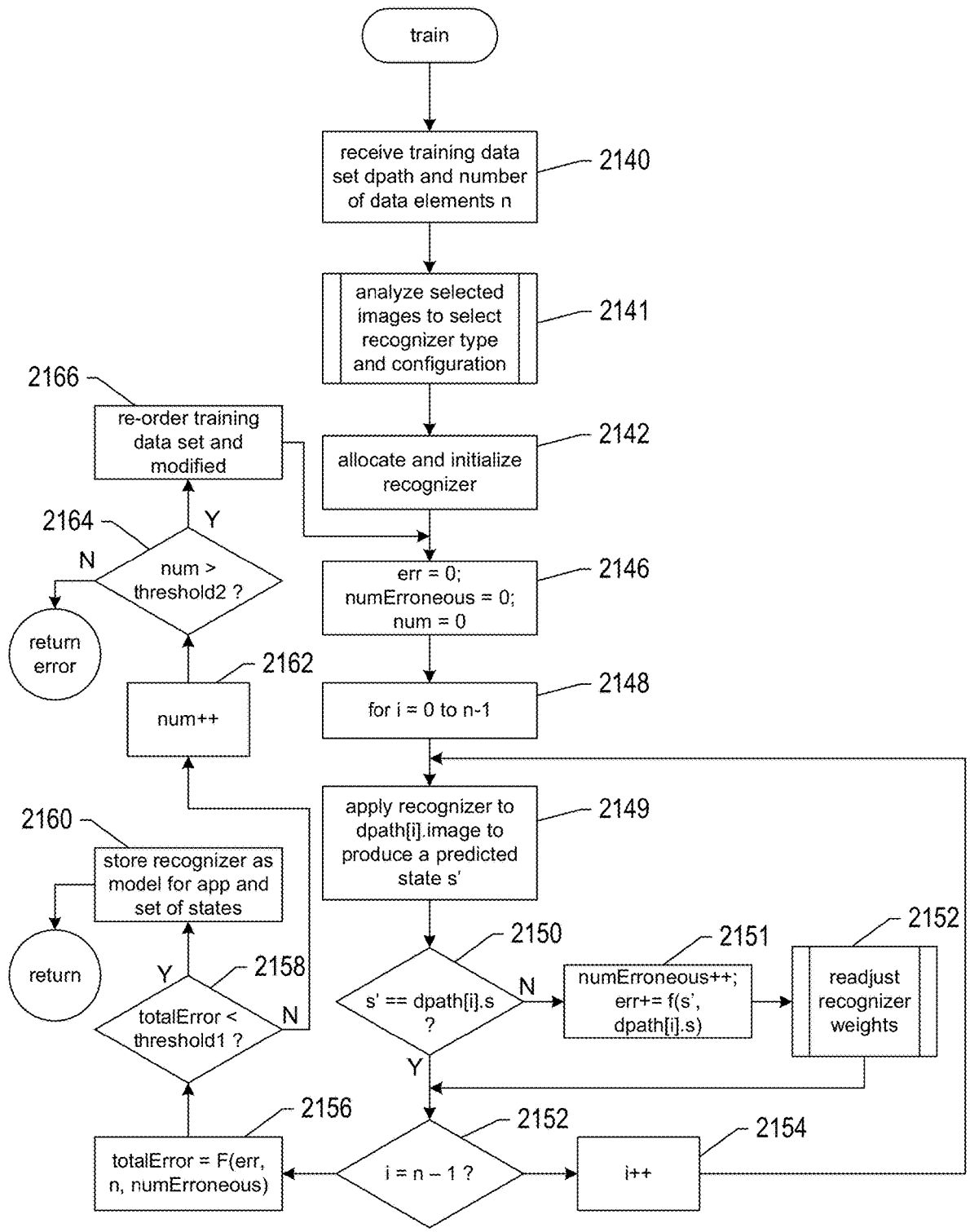

FIGS. 21A-C provide control-flow diagrams that illustrate an example implementation of the recognition-model-generation subsystem of the currently disclosed application-program performance-monitoring system. FIG. 21A provides a control-flow diagram for the data generation engine (1708 in FIG. 17A). In step 2102, the data-generation engine receives a set of images generated by application programs along with accompanying metadata. In the nested for-loops of steps 2104-2113, the data-generation engine processes each received screen-capture image. In step 2105, an entry for the currently considered image is stored in the database and the image itself is either stored in the database or in the file directory. When metadata associated with the received screen-capture image provides indications of particularly relevant regions of the image, which can be used for selecting and emphasizing those regions during training, the identified regions of interest are entered into the database. In the two nested inner for-loops of steps 2106-2112, the data-generation engine generates modified images from the currently considered screen-capture image and stores records describing the modified images in the database and the modified images either in the database or a file directory. As discussed above, there are many different possible types of modifications and specific modifications for each type that can be made, including changing colors, backgrounds, cropping the screen-capture images, changing the resolution of images, and many other modifications. By generating these modified images, the recognizers can be more robustly trained with a larger variety of screen-capture-image examples for reliable recognition of images associated with application-program states during performance monitoring in real-world settings and environments.

FIGS. 21B-C provide control control-flow diagrams that illustrate the model-training engine (1712 in FIG. 17A). In step 2120 of FIG. 21B, the model-training engine receives an application identifier, an operation identifier, a set of application-program-state identifiers S, and a set of image-selection criteria C. In the for-loop of steps 2122-2129, the model-training engine selects screen-capture images from the database to generate a set of images from which to create a training data set for training a recognizer to reliably recognize screen-capture images corresponding to the application-program states in the received set of state identifiers. Each iteration of the outer for-loop of steps 2122-2129 considers one of the application-program states in the received set of state identifiers. In step 2123, the model-training engine selects records from the Images table with application-identifier fields containing the received application identifier and with application-state fields containing the currently considered application-program state s. In addition, a file directory is created for the application-program state s. Then, in the inner for-loop of steps 2124-2128, each of the selected records is evaluated with respect to the received criteria C and, when the evaluation succeeds, as determined in step 2126, the corresponding screen-capture image for the record, or a reference to the corresponding screen-capture image, is stored in the directory created for the currently considered application-program state s. Various different criteria may be considered. For example, it may be desired to select only screen-capture images with creation dates more recent than a threshold date in order to specifically train a recognizer for one or more recent versions of the application program. In other cases, the recognizer may be specifically trained for monitoring application performance within specific types of user systems, in which case screen-capture images generated from those types of systems may be preferred for the training set. When the outer for-loop of steps 2122-2129 completes, a routine is called, in step 2130, to generate training, testing, and validation data sets. Finally, in step 2131, the routine "train" is called to create and train a recognizer for recognizing screen-capture images corresponding to the application-program states indicated by the received set of state identifiers.

FIG. 21C provides a control-flow diagram for the routine "train," called in step 2130 of FIG. 21B. In step 2140, the In step 2141, routine "train" receives a training data set dpath and an indication of the number of elements in the data set, n. the routine "train" analyzes the screen-capture images in the set of images selected the model-training engine to determine an appropriate type of recognizer and to properly configure the recognizer or, alternatively, receive input indicating the type of recognizer and configuration. There are many different types of machine-the learning techniques and approaches that may be suitable for recognizing application-program states from screen-capture images. As discussed above, convolutional neural networks are widely used for image-recognition tasks, but other types of recognizers may be appropriate in certain cases. As also discussed above, there are many different parameters by which a convolutional neural network can be characterized and according to which a convolutional neural network can be configured. These include the numbers and types of node layers, the kernels or filters used in each subnode, the total number of nodes in each layer and the number of sub-nodes in each node of each layer, and many other such configuration parameters. In step 2142, the routine "train" allocates and initializes the selected recognizer. Generation of the final training data set may involve selecting a sequence of screen-capture images and further filtering the previously selected screen-capture images. In step 2146, a local variable err is set to 0, a local variable numErroneous is set to 0, and a local variable num is set to 0. Then, in the for-loop of steps 2148-2154, the recognizer is applied to each of the n screen-capture images in the training data set to generate a predicted application-program state s'. When the application-program state s' predicted by the recognizer is not equal to the actual application-program state corresponding to the screen-capture image, as determined in step 2150, the local variable numErroneous is incremented and a computed value is added to the local variable err, in step 2151. In step 2152, the recognizer weights are readjusted in order to better optimize the recognizer for recognizing relevant application-program states. The accumulated error stored in the local variable err may be a sum of a type of difference metric that represents a disparity between the predicted state and the actual state corresponding to the screen-capture image, in certain implementations. Other types of cumulative error values may be used, in alternative implementations. Once the recognizer has been applied to all of the screen-capture images in the training data set, a total error for the recognizer is computed in step 2156. Again, various different types of total-error metrics may be employed. When the computed total error is less than a first threshold value, as determined in step 2158, the recognizer is stored as a recognition model for the set of states with respect to the currently considered application program, in step 2160. Storing a recognizer generally involves storing an indication of the type of the recognizer, a full configuration for the recognizer, and the final weights resulting from the training process. When the total error is not less than the first threshold, as determined in step 2158, the local variable num is incremented, in step 2162. When the value in the local variable num is greater than a second threshold, as determined in step 2164, the routine "train" returns an error. Otherwise, the training data set may be reordered and modified, in step 2166, and the training process continued by returning to step 2146. Thus, the routine "train" may iterate multiple times in order to achieve convergence or optimization in the recognizer weights, but in those cases in which convergence or optimization is not achieved, an error is returned.

Figure 22A:
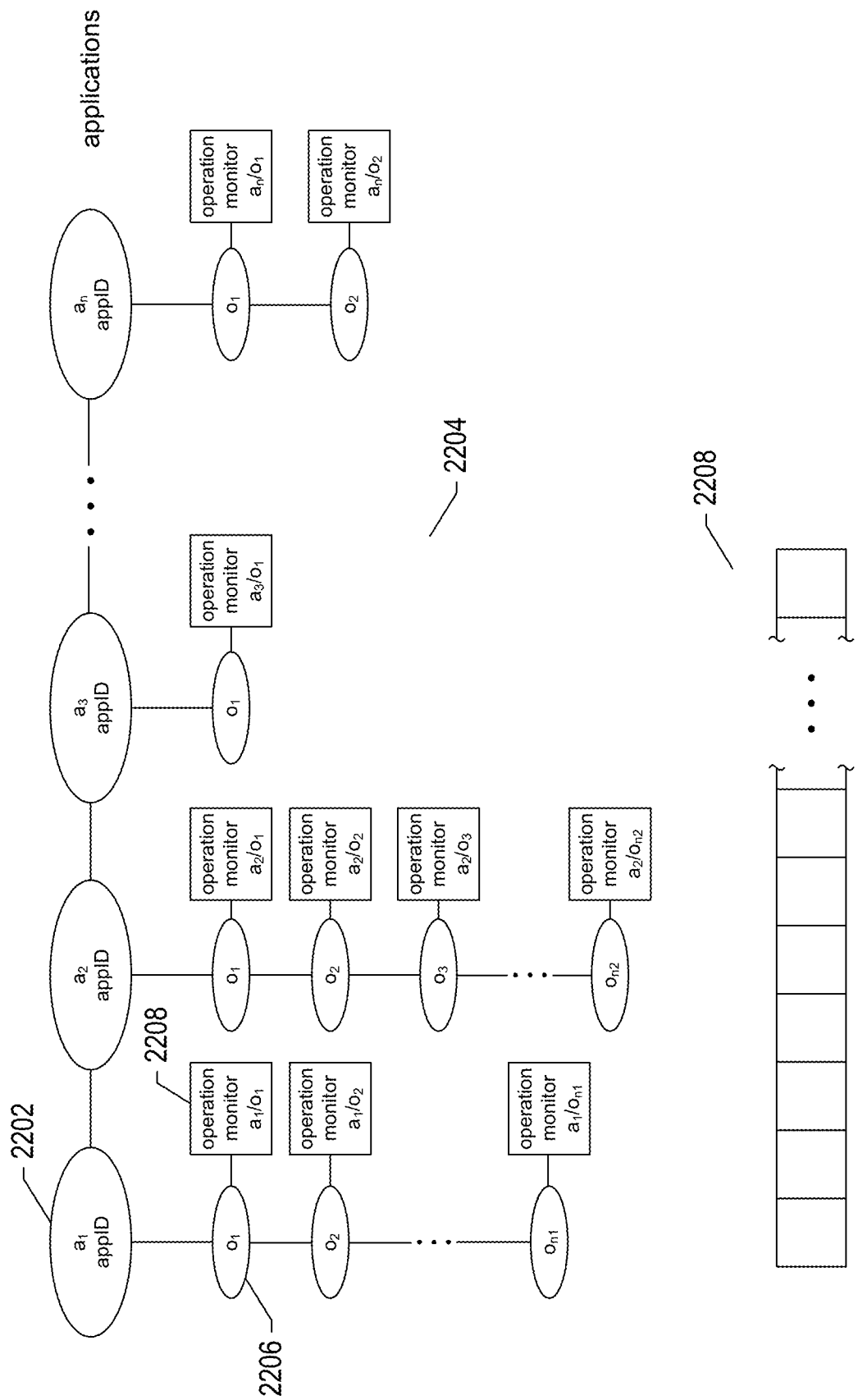
FIGS. 22A-B illustrate the data structures employed in an implementation of the performance-monitoring subsystem of the currently disclosed application-program performance-monitoring system, discussed with reference to FIGS. 23A-D.
Figure 22B:
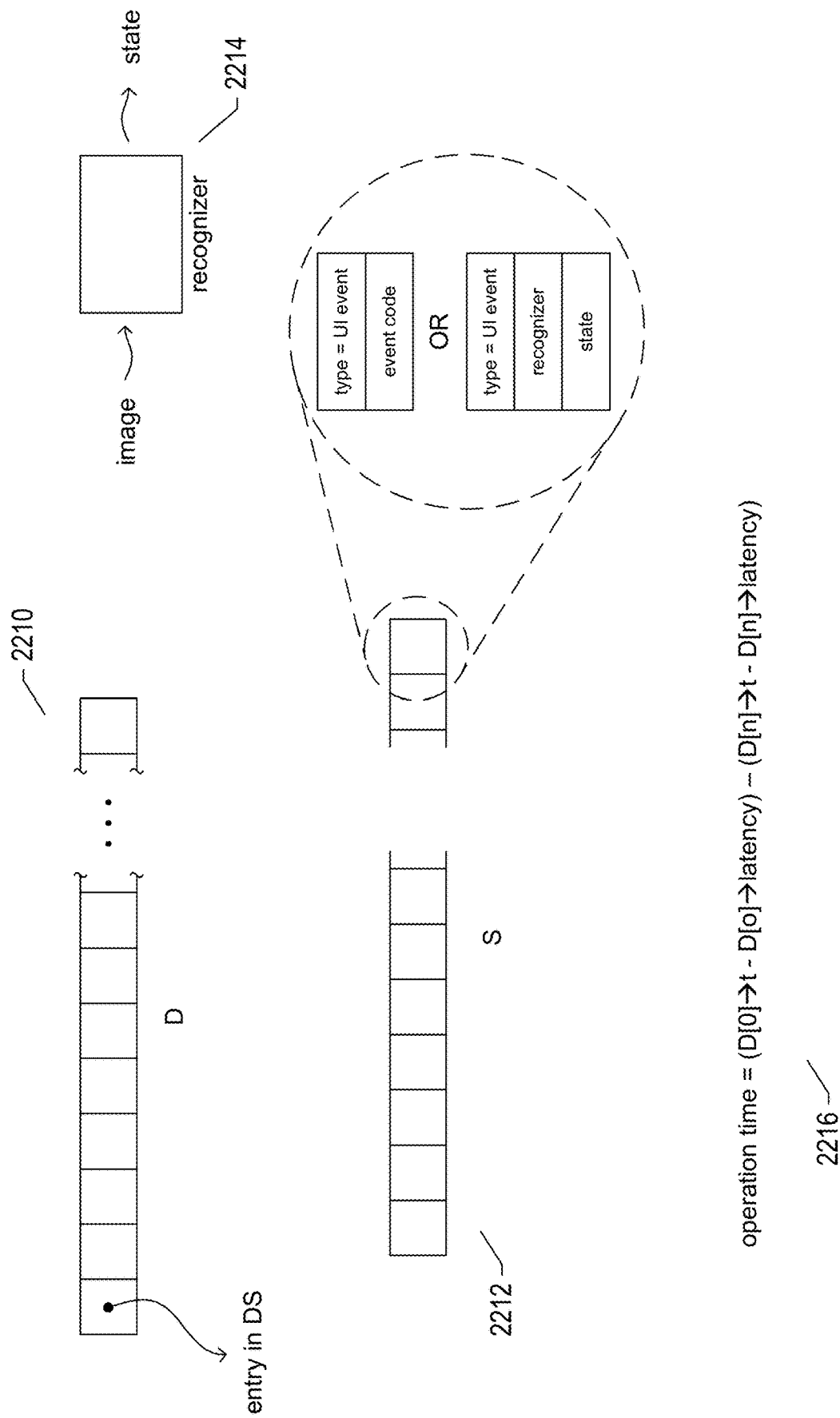

FIGS. 22A-B illustrate the data structures employed in an implementation of the performance-monitoring subsystem of the currently disclosed application-program performance-monitoring system, discussed below with reference to FIGS. 23A-D. As shown in FIG. 22A, in the described implementation, performance monitoring may be carried out on multiple different application programs to obtain response-time data for multiple different operations of each of the multiple different application programs. Each of the different application programs is represented by a node, such as node 2202, in the upper portion 2204 of FIG. 22A. Each application program may be characterized by an application identifier or another type of identifier used to relate particular screen-capture images and user-interface events to particular application programs, in implementations where that is possible. Each operation for which response-time data is collected is represented by an operation node, such as operation node 2206 that represents an operation for the application program represented by node 2202. Each operation is associated with an operation monitor, such as operation monitor 2208 associated with operation 2206. As discussed below, the operation monitor includes local data structures and variables as well as a recognizer, or a reference to a recognizer, that has been trained to recognize the various application-program states associated with the operation. The operation monitors process a data set, represented by the array DS 2208, that contains a time sequence of annotated screen-capture images and user-interface events, as discussed above with reference to FIG. 16A.

FIG. 22B illustrates the local variables associated with an operation monitor. These include an array D 2210 containing references to items in the data set represented by the array DS 2208 in FIG. 22A. The local data structures also include an array or list S 2212 of indications of the sequence of data items in the data set DS that correspond to the sequence of application-program states that together comprise an indication of execution, by the corresponding application program, of the operation monitored by the operation monitor. Finally, as mentioned above, the operation manager includes a recognizer or reference to a recognizer 2214. For each recognized operation, the operation monitor computes an elapsed time for the operation 2216 from the timestamps associated with the initial and final application-program states corresponding to the operation as well as the estimated latencies associated with these states.

Figure 23A:
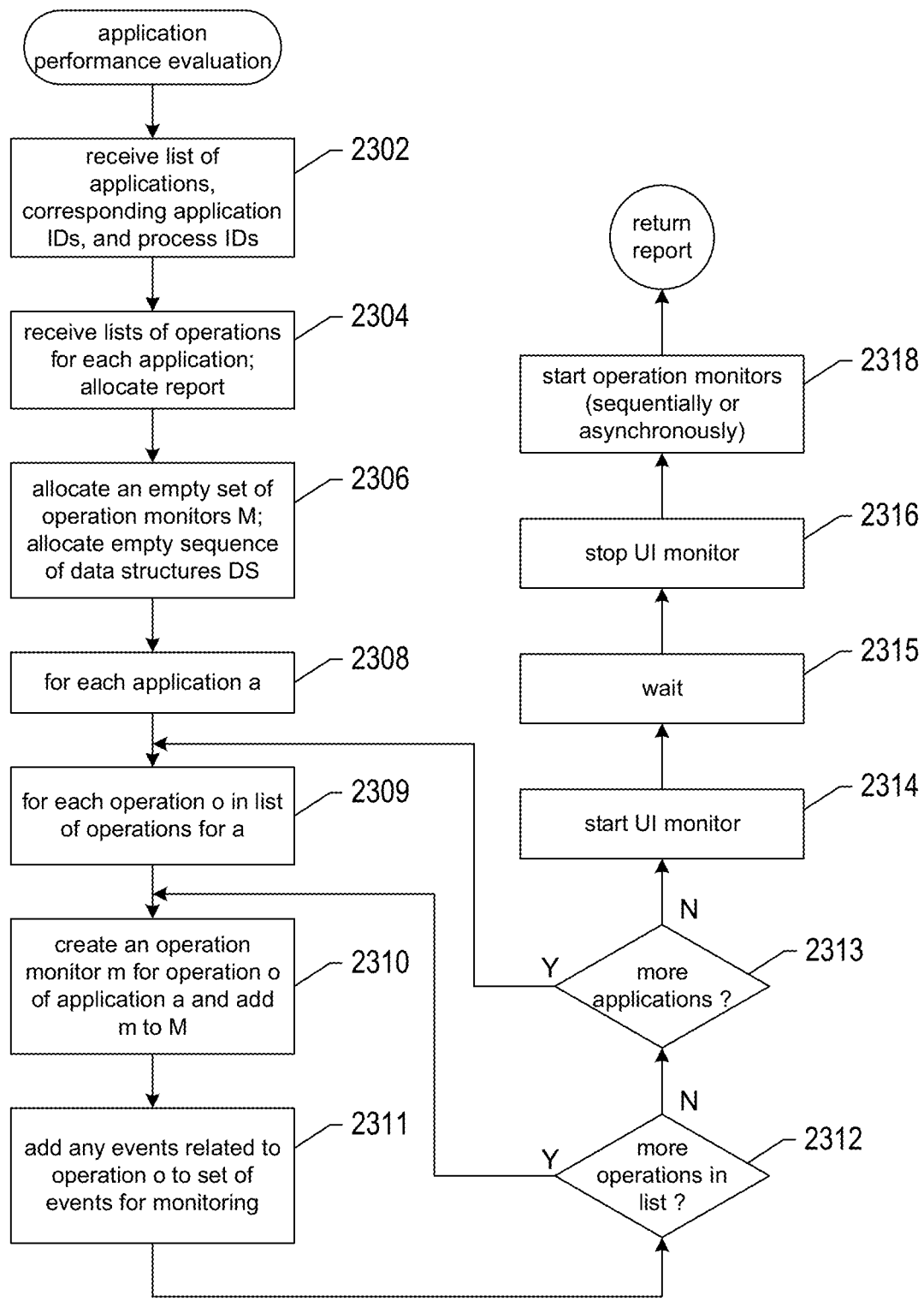
FIG. 23A-D provide control-flow diagrams that illustrate one implementation of the performance-monitoring subsystem of the currently disclosed application-program performance-monitoring system.

FIG. 23A-D provide control-flow diagrams that illustrate one implementation of the performance-monitoring subsystem of the currently disclosed application-program performance-monitoring system. FIG. 23A provides a control-flow diagram for the performance-monitoring subsystem. In step 2302, the performance-monitoring subsystem receives a list of applications and corresponding application identifiers as well as additional corresponding identifiers, such as process identifiers, used to correlate particular user-interface events with executing application programs, when such correlations are supported by the implementation. In step 2304, the performance-monitoring subsystem receives lists of operations for each of the applications in the received list of applications to monitor and allocates a report or performance-data datastore to receive results of performance monitoring. In step 2306, the performance-monitoring subsystem allocates an empty set of operation monitors M and an empty performance-monitoring-data datastore DS. In the nested for-loops of steps 2308-2313, the performance-monitoring subsystem creates an operation monitor for each operation of each application to be monitored and configures the operation monitor by populating the local data structure S (2212 in FIG. 22B) with a sequence of events corresponding to the operation to be monitored by the operation monitor. In step 2314, the performance-monitoring subsystem launches the user-interface monitor to collect user-interface-event and screen-capture data, waits for a monitoring period, in step 2315, and then terminates the user-interface monitor in step 2316. Then, in step 2318, the performance-monitoring subsystem either sequentially or concurrently launches operation monitors to process the data collected by the user-interface monitor. In certain alternative implementations, the operation monitors may operate in real time to detect application-program operations from data as it is collected by the user-interface monitor.

Figure 23B:
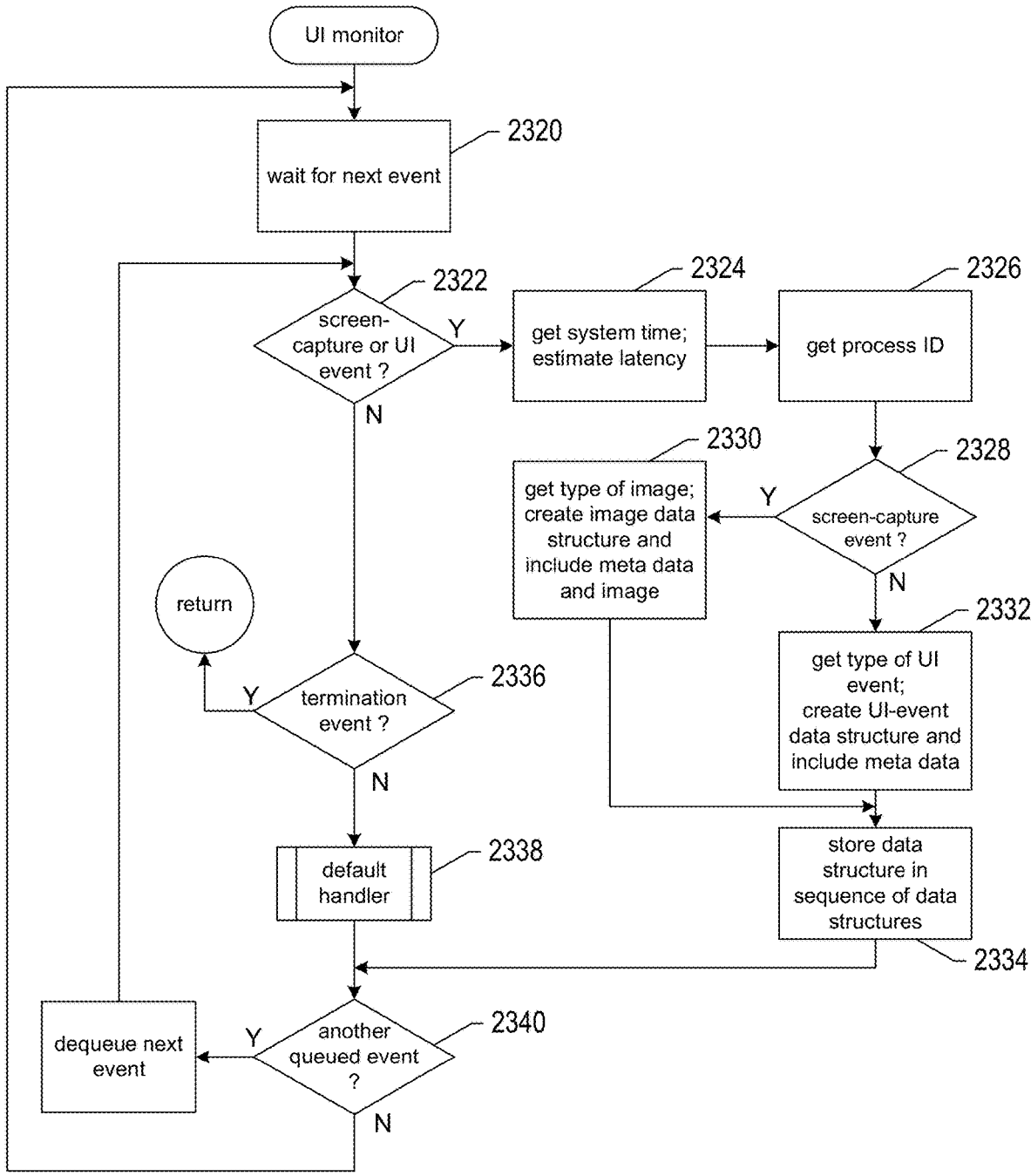

FIG. 23B provides a control-flow diagram for the user-interface monitor component of the performance-monitoring subsystem. The user-interface monitor operates as a continuous loop in which the user-interface monitor waits for the occurrence of a next event, in step 2320, and then handles the event before returning to step 2320 to wait for a next event. When the event is a screen-capture or user-interface event, as determined in step 2322, the user-interface monitor calls an operating-system to get the current system time and additionally estimates the latency from the time of the application-program state change to detection of the event in step 2324. In step 2326, the user-interface monitor accesses a process identifier or other type of identifier that allows user-interface events to be correlated with particular application programs. When the event is a screen-capture event, as determined in step 2328, the user-interface monitor determines the type of image captured and creates an image data structure for the screen-capture image in step 2330. Otherwise, in step 2332, the user-interface monitor determines the type of user-interface and then creates a user-interface-event data structure for the event. In step 2334, the data structure created in either step 2330 or step 2332 is stored in the sequence of data structures DS. When the currently considered event is a termination event, as determined in step 2336, the user-interface monitor terminates execution. A default handler handles any rare or unexpected events 338. When another event has occurred during processing of the most recently processed event, as determined in step 2340, that event is dequeued from an event queue and control flows back to step 2322. Otherwise control returns to step 2320, where the user-interface monitor waits for a next event to occur.

Figure 23C:
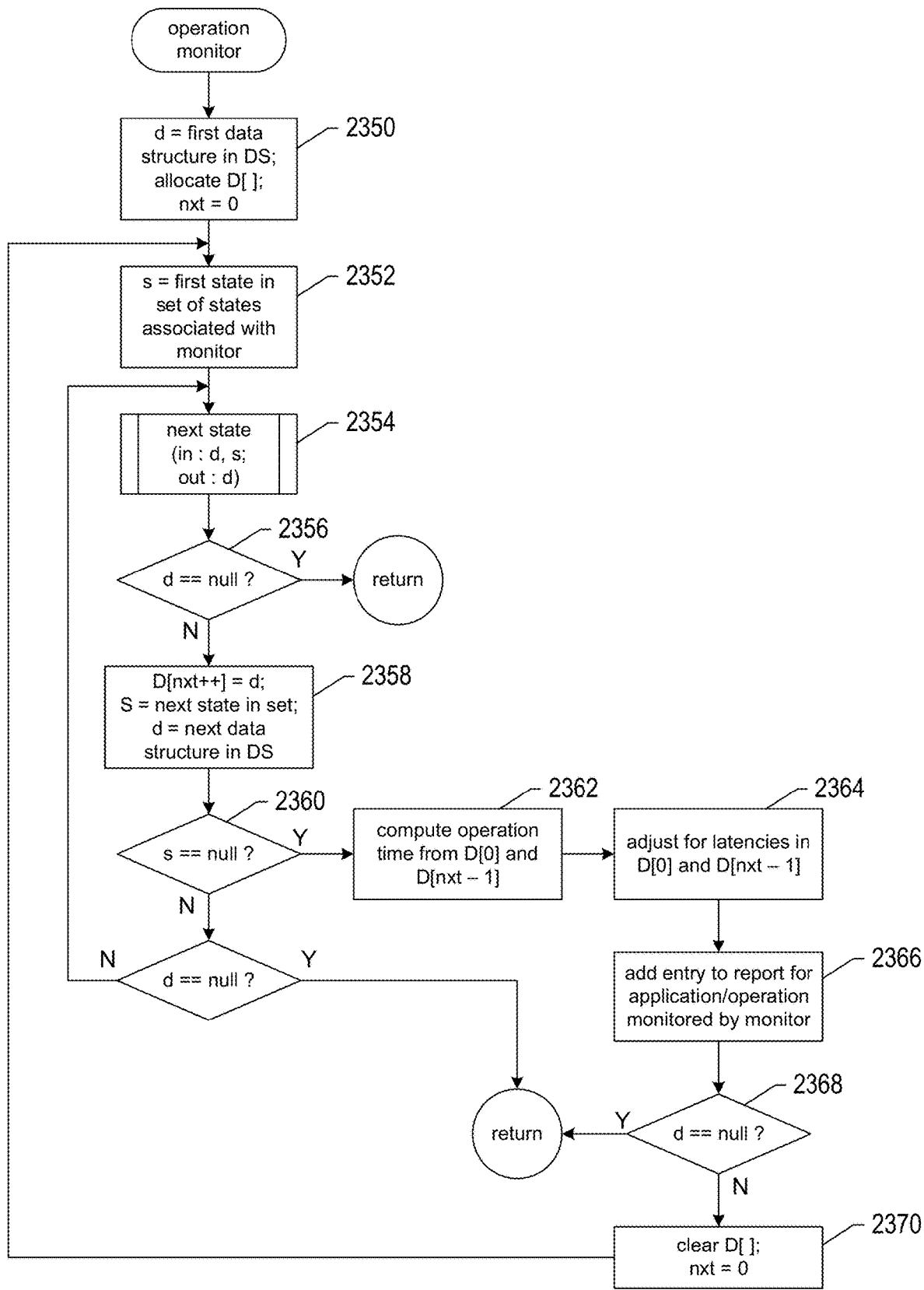

FIG. 23C provides a control-flow diagram that illustrates implementation of an operation monitor. In step 2350, the operation monitor sets a local variable d to reference the first data structure in the array or set DS, allocates a local data structure D to contain references to data structures in DS, and sets a local variable nxt to 0. In step 2352, the operation monitor sets a local variable s to reference the first state in the set of events/states S associated with the application-program operation monitored by the operation monitor. In step 2354, the operation monitor calls the routine "next state," discussed below, to return a reference to a data structure in DS corresponding to the user-interface event or screen-capture image corresponding to the currently considered event/state in the array of events/states S. When the routine "next state" returns a null value, as determined in step 2356, t the operation monitor returns, as there is no further performance-monitoring data to process. Otherwise, in step 2358, the operation monitor enters the returned reference into the set of references D corresponding to detected events and screen-capture images corresponding to the monitored operation, sets the local variable s to the next event/state in the set of events/states S, and sets the local variable d to reference the next data structure following the data structure in the performance-monitoring data DS previously referenced by the local variable d. When the local variable s is null, as determined in step 2360, then all of the events/states corresponding to the monitored operation have been detected in DS. In that case, the operation monitor computes a response time for the detected operation, in step 2362, and adjusts the computed response time based on the latency information for the beginning and ending events/states corresponding to the operation in step 2364. A response-time entry for the monitored operation is added to the report or datastore in step 2366. When the local variable d is null, as determined in step 2368, the operation monitor returns. Otherwise, the data structure D is cleared, the local variable nxt is set to 0, and control returns to step 2352 to begin looking for an indication of a next occurrence of the operation that is being monitored by the operation monitor. When s is not equal to null, as determined in step 2360, then control returns to step 2354 to look for the next event/state corresponding to the currently monitored operation.

Figure 23D:
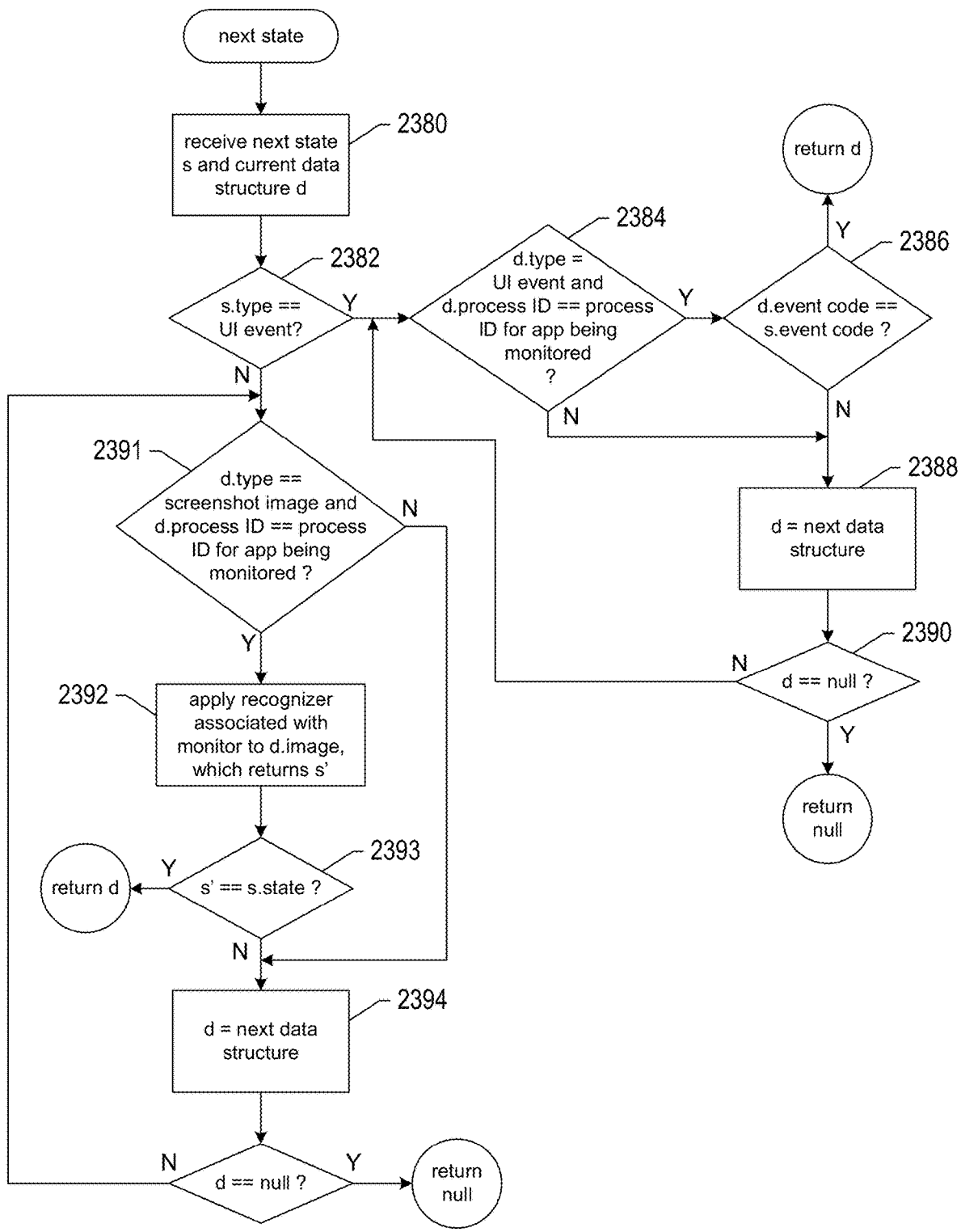

FIG. 23D provides a control-flow diagram for the routine "next state," called in step 2354 of FIG. 23C. In step 2380, the routine " next state" receives a reference to the next state/event to detect, s, and a reference d to the current data structure in the set of data structures DS from which to begin searching for the event or state corresponding to the local variable s. When the next event is a user-interface event, as determined in step 2382, and the data structure referenced by the local variable d corresponds to the user-interface event referenced by the local variable s, as determined in steps 2384 and 2386, the reference to the data structure d is returned. Otherwise, d is advanced to reference a next data structure in DS, in step 2388. When d is null, indicating that there are no further data structures in DS, as determined in step 2390, the routine "next state" returns a null value. Otherwise, control flows back to step 2384 to determine whether or not d now references a data structure corresponding to the event/state indicated by local variable s. When the local variable s references a screen-capture-indicated state, as determined in step 2382, the routine "next state" determines, in steps 2391-2393, whether the data structure referenced by local variable d is a screen-capture image representing the application-program state indicated by local variable s and, if so, returns a reference to the data structure. Otherwise, the local variable d is advanced to reference the next data structure in DS, in step 2394. When there are no further data structures, the routine "next state" returns a null value. Otherwise, control flows back to step 2391 to continue searching for a screen-capture image corresponding to the application-program state referenced by local variable s.

The present invention has been described in terms of particular embodiments, it is not intended that the invention be limited to these embodiments. Modifications within the spirit of the invention will be apparent to those skilled in the art. For example, any of many different implementations can be obtained by varying various design and implementation parameters, including modular organization, control structures, data structures, hardware, operating system, and virtualization layers, and other such design and implementation parameters. As discussed above, there are many different types of machine-learning approaches and technologies that can be used to associate application-program states with screen-capture images in addition to, volitional neural networks. Various different implementations may monitor only a single executing application at a time, unlike the disclosed implementation in which multiple executing application programs are monitored concurrently. Similarly, certain implementations may monitor one or more executing application programs for only a single operation, rather than for the occurrence of multiple operations, as in the above-described implementation. Any of many different operating-system features or specifically-encoded tools can be used for screen capture and detection of relevant user-interface events.

What is claimed is:

1. An application-program performance-measuring system comprising:
   one or more computer systems, each having one or more processors, one or more memories, and one or more data-storage devices;
   a recognition-model-generation subsystem that executes on one or more of the one or more computer systems and that
      processes images of an application-program user interface displayed during execution of the application program to generate training data sets, and
      uses the training data sets to train the one or more recognizers to identify application-program states corresponding to images of the application-program user interface; and
   a performance-monitoring subsystem that executes on one or more of the one or more computer systems and that
      captures images of the application-program user interface displayed during execution of the application program, each captured image associated with a timestamp and additional metadata,
      applies the one or more recognizers to determine application-program states corresponding to the captured images of the application-program user interface,
      identifies executions of application-program operations as time-ordered sequences of application-program states associated with captured images of the application-program user interface,
      determines a response time for each identified operation from timestamps associated with the captured images of the application-program user interface associated with the time-ordered sequence of application-program states corresponding to the operation, and
      uses the determined response times to generate a performance report and/or store performance data in a datastore.

2. The application-program performance-measuring system of claim 1 wherein the recognizers are machine-learning subsystems that recognize sets of one or more features in captured images of the application-program user interface indicative of particular application-program states, receiving a captured image as input and outputting an application-program state as output.

3. The application-program performance-measuring system of claim 2 wherein each type of recognizer is associated with a set of weights that encode the results of training and a set of configuration parameters.

4. The application-program performance-measuring system of claim 3 wherein recognizer types include:
   convolutional neural networks
   deep convolutional neural networks;
   neural networks,
   deep neural networks,
   support-vector machines,
   linear-discriminant-analysis-based recognizers,
   principle-component-analysis-based recognizers, and
   k-nearest-neighbor-based recognizers.

5. The application-program performance-measuring system of claim 1 wherein, in addition to capturing images of the application-program user interface displayed during execution of the application program, the performance-monitoring subsystem records user-interface events detected during execution of the application program, each detected user-interface event associated with a timestamp and additional metadata.

6. The application-program performance-measuring system of claim 5 wherein the user-interface events include mouse-click events, keyboard-input events, and other events associated with the application-program user interface.

7. The application-program performance-measuring system of claim 5 wherein each application-program operation monitored by the application-program performance-measuring system is represented by a transition of the application program from an initial application-program state to a final application-program state.

8. The application-program performance-measuring system of claim 7 wherein the initial application-program state and final application-program state are each associated with one or more events, the one or more events selected from:
   captured images of the application-program user interface that are each associated with metadata, including a timestamp; and
   user-interface events that are each associated with metadata, including a timestamp.

9. The application-program performance-measuring system of claim 8 wherein the response time for each executed application-program operation is determined by:
adjusting the timestamp values associated with a first event of the one or more events that represent the initial application-program state and with a second event of the one or more events that represent the final application-program state using latency values associated with the first and second events; and
computing a difference in the adjusted timestamp values.

10. A method for measuring the performance of an application program, the method comprising:
capturing images of an application-program user interface displayed during execution of the application program, each captured image associated with a timestamp and additional metadata;
recording user-interface events detected during execution of the application program, each user-interface event associated with a timestamp and additional metadata;
applying one or more recognizers to determine application-program states corresponding to the captured images of the application-program user interface;
identifying executions of application-program operations as time-ordered sequences of application-program states associated with captured images of the application-program user interface;
determining a response time for each identified operation from timestamps associated with the captured images of the application-program user interface associated with the time-ordered sequence of application-program states corresponding to the operation; and
using the determined response times to generate a performance report and/or store performance data in a datastore.

11. The method of claim 10 further comprising:
processing images of the application-program user interface displayed during execution of the application program to generate training data sets; and
using the training data sets to train the one or more recognizers to identify application-program states corresponding to images of the application-program user interface.

12. The method of claim 11 wherein the recognizers are machine-learning subsystems that recognize sets of one or more features in captured images of the application-program user interface indicative of particular application-program states, receiving a captured image as input and outputting an application-program state as output.

13. The method of claim 11 wherein each type of recognizer is associated with a set of weights that encode the results of training and a set of configuration parameters.

14. The method of claim 13 wherein recognizer types include:
convolutional neural networks
deep convolutional neural networks;
neural networks,
deep neural networks,
support-vector machines,
linear-discriminant-analysis-based recognizers,
principle-component-analysis-based recognizers, and
k-nearest-neighbor-based recognizers.

15. The method of claim 13 wherein the user-interface events include mouse-click events, keyboard-input events, and other events associated with the application-program user interface.

16. The method of claim 15 wherein each application-program operation is represented by a transition of the application program from an initial application-program state to a final application-program state.

17. The method of claim 16 wherein the initial application-program state and final application-program state are each associated with one or more events, the one or more events selected from:
captured images of the application-program user interface that are each associated with metadata, including a timestamp; and
user-interface events that are each associated with metadata, including a timestamp.

18. The method of claim 17 wherein the response time for each executed application-program operation is determined by:
adjusting the timestamp values associated with a first event of the one or more events that represent the initial application-program state and with a second event of the one or more events that represent the final application-program state using latency values associated with the first and second events; and
computing a difference in the adjusted timestamp values.

19. Computer instructions, stored in a physical data-storage device, that, when executed by one or more processors within an application-program performance-measuring system, control the application-program performance-measuring system to:
capture images of an application-program user interface displayed during execution of the application program, each captured image associated with a timestamp and additional metadata;
record user-interface events detected during execution of the application program, each user-interface event associated with a timestamp and additional metadata;
apply one or more recognizers to determine application-program states corresponding to the captured images of the application-program user interface;
identify executions of application-program operations as time-ordered sequences of application-program states associated with captured images of the application-program user interface;
determine a response time for each identified operation from timestamps associated with the captured images of the application-program user interface associated with the time-ordered sequence of application-program states corresponding to the operation; and
use the determined response times to generate a performance report and/or store performance data in a datastore.

20. The computer instructions of claim 19 wherein the computer instruction further control the application-program performance-measuring system to:
process images of the application-program user interface displayed during execution of the application program to generate training data sets; and
use the training data sets to train the one or more recognizers to identify application-program states corresponding to images of the application-program user interface.

* * * * *